United States Patent
Lu et al.

(10) Patent No.: US 11,630,279 B2
(45) Date of Patent: Apr. 18, 2023

(54) SPLICE-ON CABLE BREAKOUT ASSEMBLY

(71) Applicant: CommScope Technologies LLC, Hickory, NC (US)

(72) Inventors: Yu Lu, Eden Prairie, MN (US); Oscar Fernando Bran de Leon, Belle Plaine, MN (US); Scott Carlson, Bloomington, MN (US); Thomas Marcouiller, Shakopee, MN (US)

(73) Assignee: CommScope Technologies LLC, Hickory, NC (US)

( * ) Notice: Subject to any disclaimer, the term of this patent is extended or adjusted under 35 U.S.C. 154(b) by 197 days.

(21) Appl. No.: 16/999,346

(22) Filed: Aug. 21, 2020

(65) Prior Publication Data
US 2021/0072485 A1    Mar. 11, 2021

Related U.S. Application Data

(63) Continuation of application No. 16/378,034, filed on Apr. 8, 2019, now Pat. No. 10,761,287, which is a
(Continued)

(51) Int. Cl.
*G02B 6/44* (2006.01)
*G02B 6/255* (2006.01)

(52) U.S. Cl.
CPC ......... *G02B 6/4471* (2013.01); *G02B 6/2558* (2013.01); *G02B 6/44* (2013.01);
(Continued)

(58) Field of Classification Search
CPC ...... G02B 6/4452; G02B 6/44; G02B 6/4471; G02B 6/4479; G02B 6/2558; G02B 6/4472; Y10T 29/49826
(Continued)

(56) References Cited

U.S. PATENT DOCUMENTS

| 5,185,840 A | 2/1993 | Iapicco |
| 5,253,315 A | 10/1993 | Fentress |

(Continued)

FOREIGN PATENT DOCUMENTS

| JP | 2001-330765 | 11/2001 |
| KR | 10-2009-0116650 | 11/2009 |

OTHER PUBLICATIONS

Celanex® thermoplastic polyester Short Term Properties Brochure, Ticona A business of Celanese AG, 10 pages (Copyright 2001).

*Primary Examiner* — Jerry M Blevins
(74) *Attorney, Agent, or Firm* — Merchant & Gould P.C.

(57) ABSTRACT

A break-out assembly includes an enclosure defining a first port at the first end to receive an optical cable and a second port at the second end to receive a plurality of break-out cables. Each port leads to the interior of the enclosure. A cable retention region defined within the enclosure at the second end is configured to enable the break-out cables to each secure to the enclosure at one of a plurality of axial locations. Certain types of break-out assemblies include other cable retention regions to axially and/or rotationally secure the optical cable to the enclosure. A splice retention region is disposed within the enclosure between the first port and the second cable retention region. The splice retention region receives optical splices at which optical fibers of the optical cable are spliced to optical fibers of the break-out cables.

28 Claims, 24 Drawing Sheets

Related U.S. Application Data continuation of application No. 15/354,512, filed on Nov. 17, 2016, now Pat. No. 10,254,500, which is a continuation of application No. 14/036,628, filed on Sep. 25, 2013, now Pat. No. 9,500,830.

(60) Provisional application No. 61/707,223, filed on Sep. 28, 2012.

(52) U.S. Cl.
CPC ......... *G02B 6/4452* (2013.01); *G02B 6/4472* (2013.01); *G02B 6/4479* (2013.01); *Y10T 29/49826* (2015.01)

(58) Field of Classification Search
USPC .................................. 385/135, 136; 29/428
See application file for complete search history.

(56) References Cited

U.S. PATENT DOCUMENTS

| | | | |
|---|---|---|---|
| 5,491,766 A | 2/1996 | Huynh et al. | |
| 5,588,082 A | 12/1996 | Whitesmith | |
| 5,745,633 A * | 4/1998 | Giebel | G02B 6/4446 385/136 |
| 5,915,055 A | 6/1999 | Bennett et al. | |
| 5,925,462 A | 7/1999 | Girgis | |
| 6,379,054 B2 | 4/2002 | Throckmorton et al. | |
| 6,389,214 B1 | 5/2002 | Smith et al. | |
| 6,438,300 B1 | 8/2002 | Bernstein et al. | |
| 6,439,780 B1 | 8/2002 | Mudd et al. | |
| 6,771,861 B2 | 8/2004 | Wagner et al. | |
| 7,104,702 B2 | 9/2006 | Barnes et al. | |
| 7,192,194 B2 | 3/2007 | Giotto et al. | |
| 7,216,512 B2 | 5/2007 | Danley et al. | |
| 7,228,047 B1 | 6/2007 | Szilagyi et al. | |
| 7,264,401 B2 | 9/2007 | Johnson | |
| 7,264,410 B1 | 9/2007 | Doss et al. | |
| 7,270,485 B1 | 9/2007 | Robinson et al. | |
| 7,270,487 B2 | 9/2007 | Billman et al. | |
| 7,281,859 B2 | 10/2007 | Mudd et al. | |
| 7,329,049 B2 | 2/2008 | Meek et al. | |
| 7,440,667 B2 | 10/2008 | Mullaney et al. | |
| 7,572,064 B2 | 8/2009 | deJong | |
| 7,594,764 B2 | 9/2009 | Palmer et al. | |
| 7,658,553 B2 | 2/2010 | Semmler et al. | |
| 7,815,377 B2 | 10/2010 | Doss et al. | |
| 7,945,136 B2 | 5/2011 | Cooke et al. | |
| 8,333,519 B2 | 12/2012 | Marcouiller et al. | |
| 8,457,461 B2 | 6/2013 | Ott | |
| 9,500,830 B2 | 11/2016 | Lu et al. | |
| 10,254,500 B2 | 4/2019 | Lu et al. | |
| 10,761,287 B2 | 9/2020 | Lu et al. | |
| 2003/0091315 A1* | 5/2003 | Allerellie | G02B 6/4447 385/135 |
| 2003/0179980 A1 | 9/2003 | Baechtle | |
| 2005/0249475 A1 | 11/2005 | Womack et al. | |
| 2007/0212004 A1 | 9/2007 | Lu et al. | |
| 2008/0013888 A1 | 1/2008 | Barnes et al. | |
| 2008/0138026 A1 | 6/2008 | Yow et al. | |
| 2008/0170833 A1 | 7/2008 | Castonguay et al. | |
| 2009/0022457 A1 | 1/2009 | de Jong et al. | |
| 2009/0060421 A1 | 3/2009 | Parikh et al. | |
| 2010/0142905 A1 | 6/2010 | Billman et al. | |
| 2010/0183265 A1 | 7/2010 | Barnes et al. | |
| 2010/0303416 A1 | 12/2010 | Danley et al. | |
| 2011/0136353 A1 | 6/2011 | Spitaels et al. | |
| 2012/0230636 A1 | 9/2012 | Blockley et al. | |
| 2013/0287356 A1 | 10/2013 | Solheid et al. | |

* cited by examiner

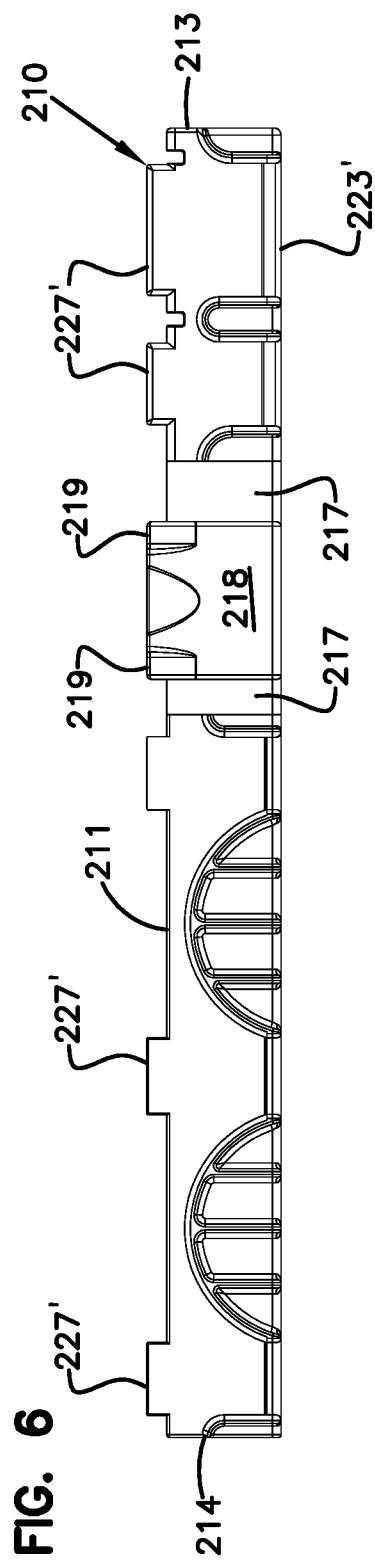
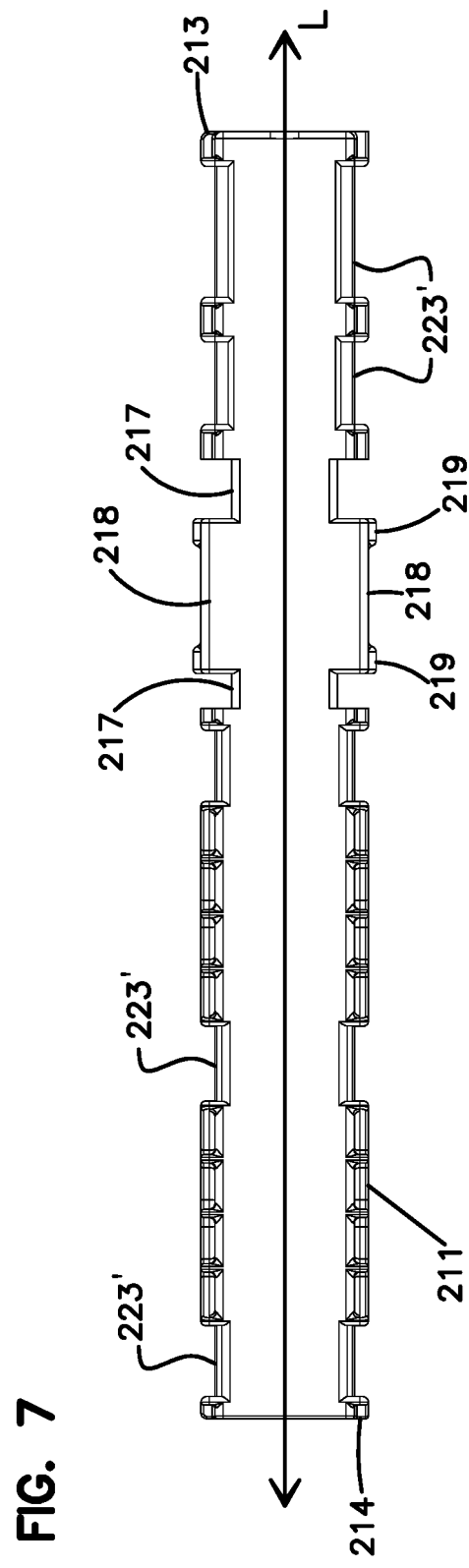

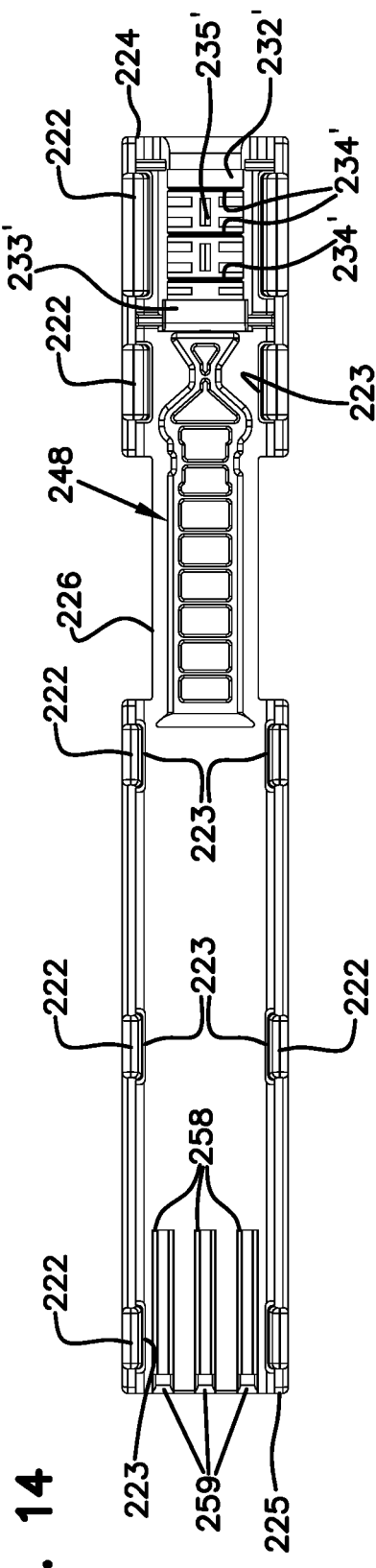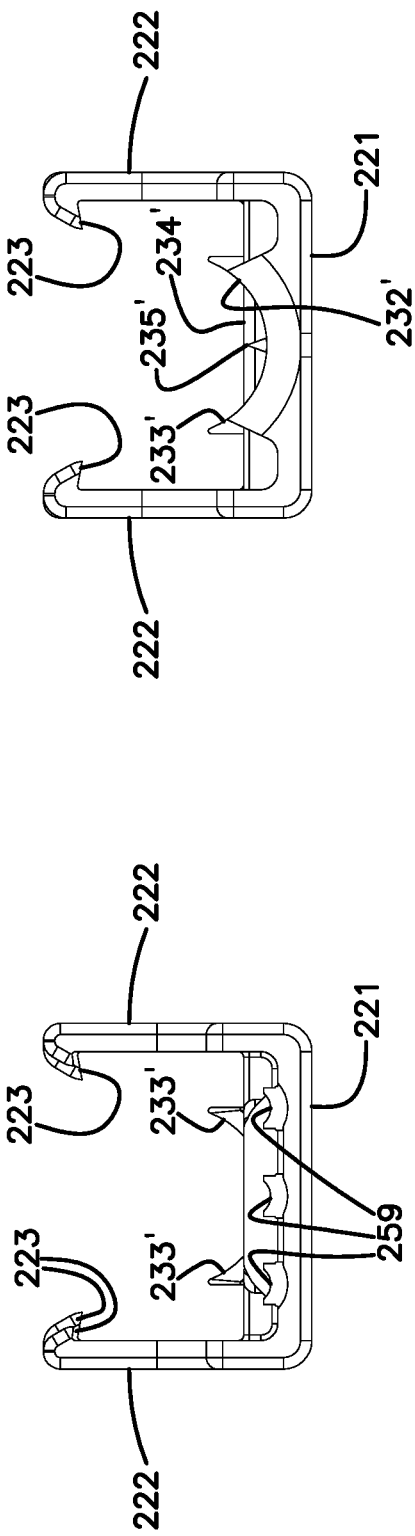

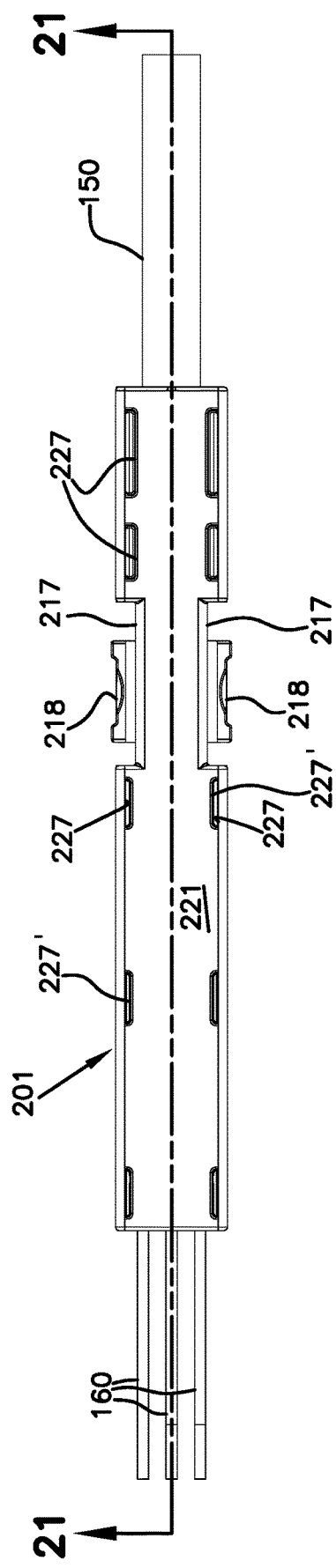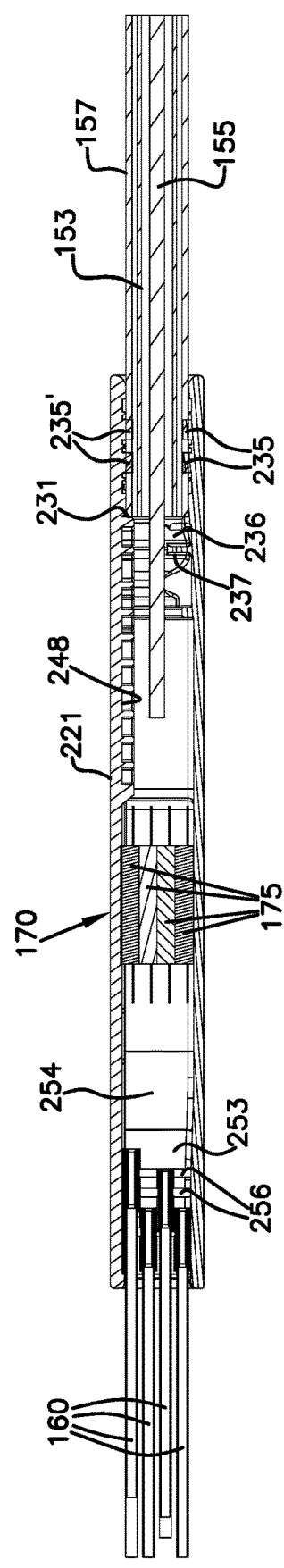

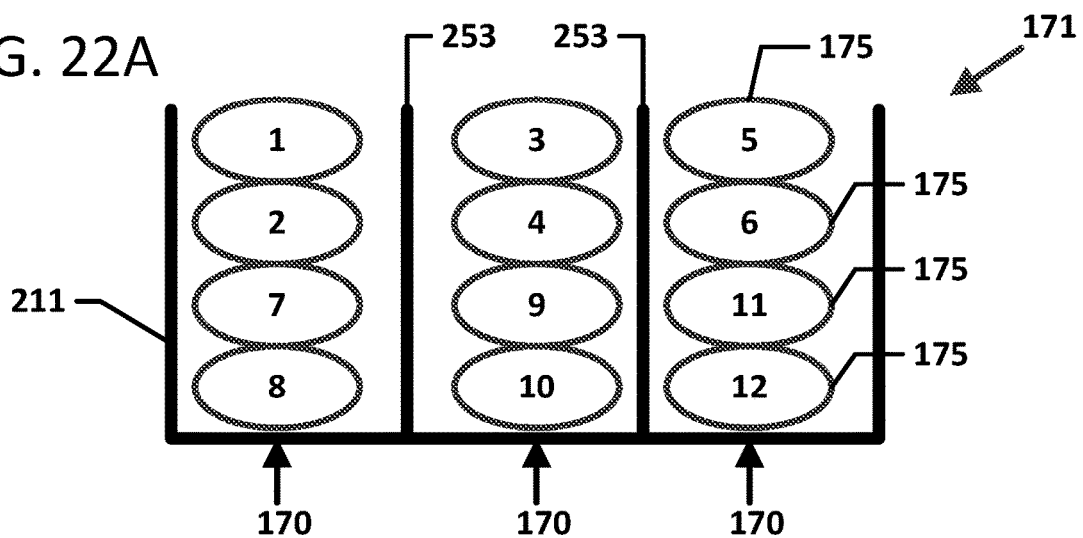
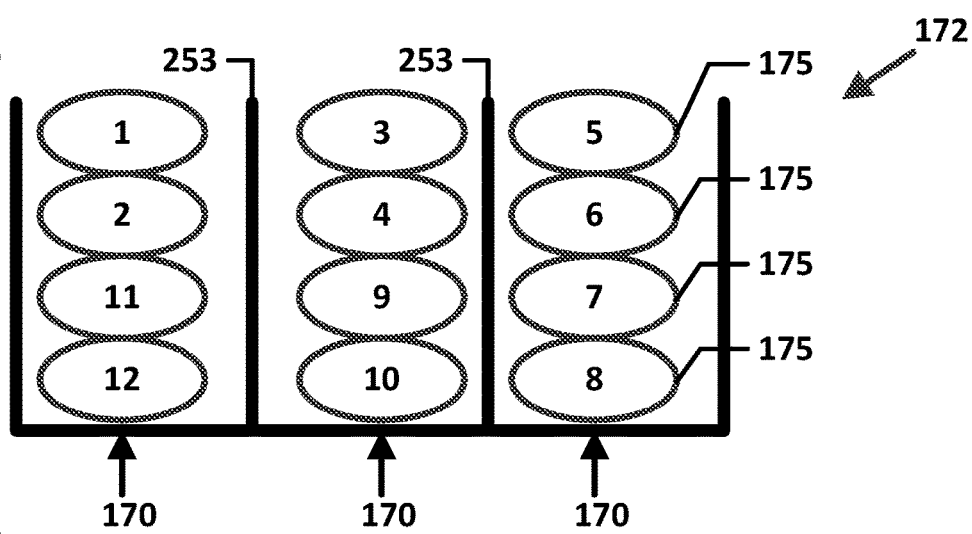
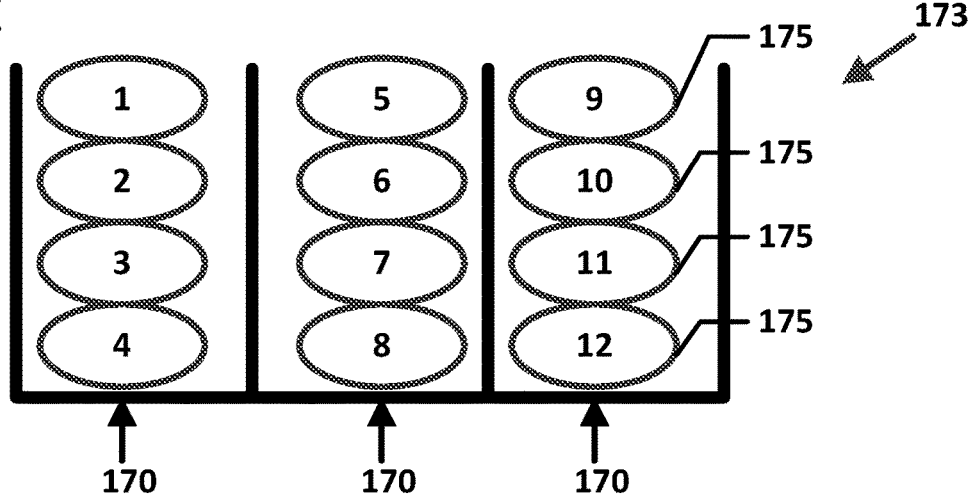

SPLICE-ON CABLE BREAKOUT ASSEMBLY

CROSS REFERENCE TO RELATED APPLICATION

This application is a continuation of application Ser. No. 16/378,034, filed Apr. 8, 2019, now U.S. Pat. No. 10,761,287, which is a continuation of application Ser. No. 15/354,512, filed Nov. 17, 2016, now U.S. Pat. No. 10,254,500, which is a continuation of application Ser. No. 14/036,628, filed Sep. 25, 2013, now U.S. Pat. No. 9,500,830, which application claims the benefit of provisional application Ser. No. 61/707,223, filed Sep. 28, 2012, and titled "Splice-On Cable Breakout Assembly," which applications are hereby incorporated by reference in their entirety.

BACKGROUND

In telecommunications industry, the demand for added capacity is growing rapidly. This demand is being met in part by the increasing use and density of fiber optic transmission equipment. Even though fiber optic equipment permits higher levels of transmission in the same or smaller footprint than traditional copper transmission equipment, the demand requires even higher levels of fiber density. This has led to the development of high-density fiber handling equipment.

An example of this type of equipment is found in U.S. Pat. No. 6,591,051 (the '051 patent) assigned to ADC Telecommunications, Inc. This patent concerns a high-density fiber distribution frame and high-density fiber termination blocks (FTBs) which are mounted to the frame. Because of the large number of optical fibers passing into and out of the FTBs, the frame and blocks have a variety of structures to organize and manage the fibers. Some structures are used to aid the fibers entering the back of the frame and FTBs. Other structures are provided for managing the cables leaving the FTBs on the front. The FTBs also include structures for facilitating access to the densely packed terminations. One such structure is a slidable adapter module that is incorporated into the FTBs to allow selective access to the densely packed terminations inside the FTBs.

Further development in such fiber termination systems is desired.

SUMMARY

In accordance with some aspects of the disclosure, a break-out assembly includes an enclosure defining an interior, a first port at a first end, and a second port at the second end. A second cable retention region is defined within the enclosure at the second end of the enclosure. The second cable retention region is configured to enable break-out cables to each secure to the enclosure at one of a plurality of axial locations. A splice retention region is disposed between the first port and the second cable retention region. The splice retention region is configured to receive optical splices at which optical fibers of an optical cable are spliced to optical fibers of the break-out cables.

In accordance with other aspects of the disclosure, a break-out assembly including a base extending from a first end to a second end along a longitudinal axis. The base defines an open top, a first port at the first end, and a second port at the second end. The base partially defines a first cable retention region at the first end and a second cable retention region at the second end. An intermediate section of the base at least partially defines a splice retention region. The base includes a stop surface, at least one retention member, and at least one tooth at the first cable retention region. The stop surface is sized so that a jacket of an optical cable extending through the first port engages the stop surface while optical fibers of the optical cable pass by the stop surface. The retention member bites into the jacket to inhibit axial movement of the optical cable. The tooth bites into the jacket to inhibit rotational movement of the optical cable. The base includes at least one wall at the second cable retention region that separates the second cable retention region into a plurality of passages. Each wall defines slots that are spaced longitudinally from each other along the wall. Each slot is configured to receive part of a crimp arrangement of a break-out cable. A cover is configured to mount to the base to cover the open top of the base. The cover cooperates with the base to define the first and second cable retention regions.

In accordance with other aspects of the disclosure, a bracket for holding break-out assemblies includes a mounting section, a first plurality of arms, and a second plurality of arms. The mounting section extends from a first end to a second end, and from a first side to a second side. The arms of the first plurality extend from the first side of the mounting section. Each arm of the first plurality includes first and second retention fingers. The arms of the second plurality extend from the second side of the mounting section. The arms of the second plurality are laterally aligned with the arms of the first plurality to form lateral arm pairs. Each arm of the second plurality also includes first and second retention fingers. The first retention fingers are located at a distal end of the respective arm and the second retention fingers are located between the respective first retention finger and the mounting section. The first retention fingers of each lateral arm pair define a first mounting location between the first retention fingers and the mounting section. The second retention fingers of each lateral arm pair define a second mounting location between the first retention fingers and the second retention fingers.

In accordance with other aspects of the disclosure, a method of mounting a break-out assembly at a bracket includes positioning the break-out assembly so that a narrow section of the break-out assembly aligns with a gap between adjacent longitudinally spaced arms of the bracket; sliding the break-out assembly into the gap to a selected one of a first mounting location and a second mounting location that are each defined by retention fingers of the adjacent longitudinally spaced arms; and continuing to slide the break-out assembly into the selected one of the mounting locations as latch members of the break-out assembly deflect towards each other to cam over the retention fingers of the first mounting location until the latch members clear the retention fingers of the selected mounting location, deflect outwardly, and engage the retention fingers of the selected mounting location.

A variety of additional inventive aspects will be set forth in the description that follows. The inventive aspects can relate to individual features and combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows:

FIG. 6 is a side elevational view of a base of the break-out assembly of FIG. 3;

FIG. 7 is a bottom plan view of the base of FIG. 6;

FIG. 14 is a bottom plan view of the cover of FIG. 11;

FIG. 15 is a first end view of the cover of FIG. 11;

FIG. 16 is a second end view of the cover of FIG. 11;

FIG. 20 is a top plan view of the break-out assembly of FIG. 17;

FIG. 21 is a longitudinal cross-section of the break-out assembly of FIG. 20 taken along the 21-21 section line;

FIG. 22A-22C are schematic diagrams that illustrate example stacking configurations for optical splices within a break-out assembly;

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

Figure 1:
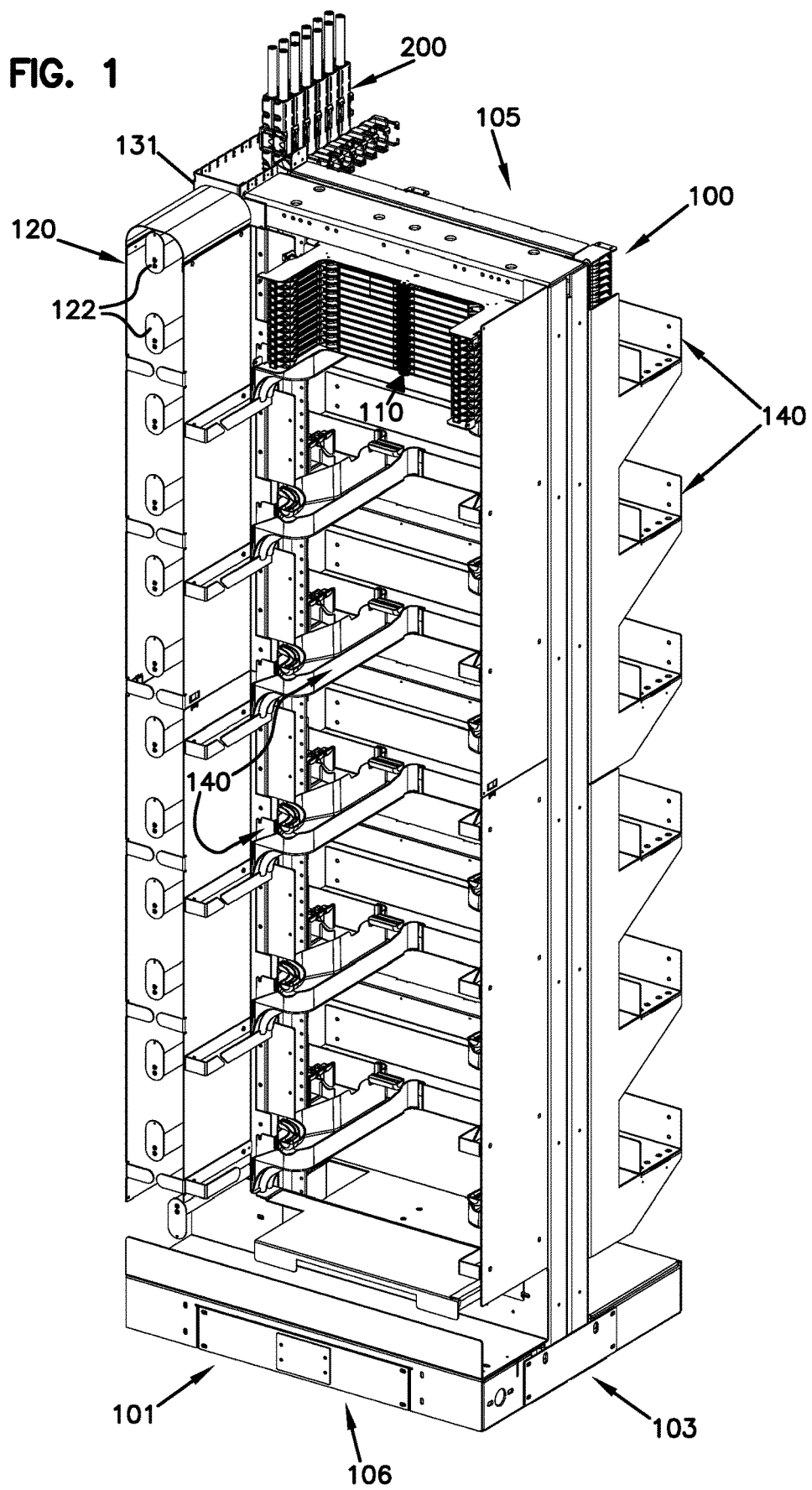
FIG. 1 is a front perspective view of an example rack at which one or more break-out assemblies can be mounted.
Figure 2:
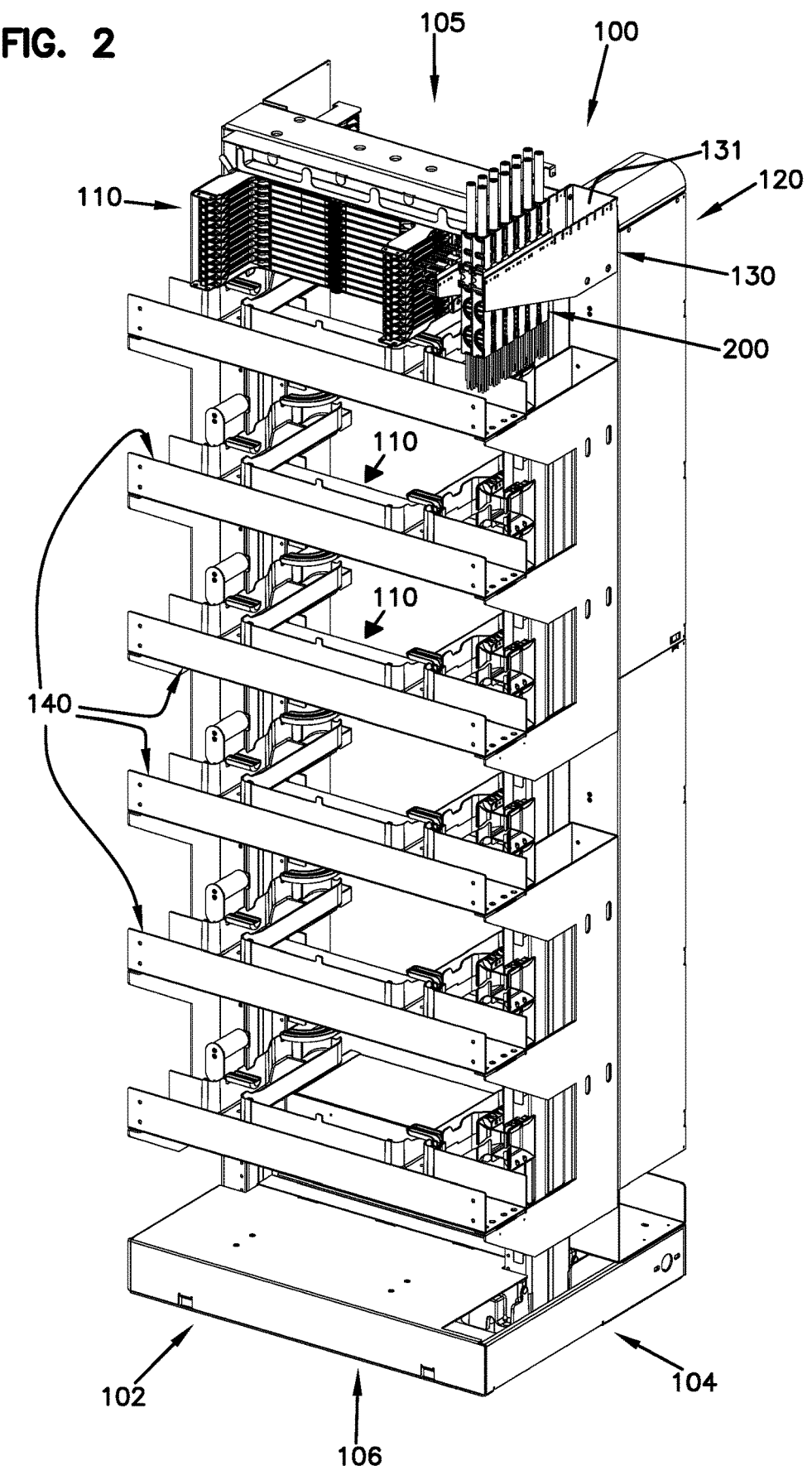
FIG. 2 is a rear perspective view the example rack of FIG. 1.

FIGS. 1 and 2 illustrate an example rack 100 at which optical fibers can be connected. The rack 100 has a front 101, a rear 102, a first side 103, a second side 104, a top 105, and a bottom 106. The rack 100 defines one or more termination regions 110. In certain implementations, the rack 100 includes a vertical stack of termination regions 110. Connection locations at the termination regions 110 are accessible from both the front 101 and rear 102 of the rack 100. A trough system 140 connects each termination region 110 of the rack 100 with other termination regions 110 of the rack 100 or with termination regions 110 of other racks 100.

In some implementations, termination modules are mounted at the termination regions 110. In various implementations, the termination modules can define individually mounted adapters, blocks of integrally formed adapters, and/or cassettes that include optical adapters having either a multi-fiber connector or a multi-fiber cable extending outwardly therefrom. In certain implementations, termination modules are slidable relative to the rack 100. Example slidable termination modules can be found in U.S. Provisional Application No. 61/704,330, filed Sep. 21, 2012, and titled "Slidable Fiber Optic Connection Module with Cable Slack Management," the disclosure of which is hereby incorporated herein by reference.

The rack 100 includes a transition region 130 at which one or more optical cables 150 (e.g., multi-fiber cables, such as IFC cables) are routed on/off the rack 100. In some implementations, the transition region 130 is located at the rear 102 of the rack 100. In the example shown, the transition region 130 is located at the top 105 of the rack 100. The optical cables 150 transition to break-out cables 160 (e.g., individual fibers or smaller groups of individual fibers) at the transition region 130. Optical connectors and/or cassettes terminating the break-out cables 160 are routed from the transition region 130 to connection locations at one or more of the termination regions 110 at the rear side 102 of the rack 100.

The connection locations at the rear side 102 of the rack 100 connect to the connection locations at the front side 101 of the rack 100. Patch cords are routed across the front of the rack 100 between connection locations at the front side 101. Accordingly, a fiber of a first break-out cable 160 and a fiber of a second break-out cable 160 can be optically coupled by connecting one end of a patch cord to the fiber of the first break-out cable 160 through the respective termination region 110 and connecting another end of the patch cord to the fiber of the second break-out cable 160 through the respective termination region 110. The patch cords may be routed between connection locations at the same termination region 110, different termination regions 110 at the same rack 100, or termination regions 110 at different racks 100. Slack length of the patch cords can be wound around one or more spools 122 at a storage region 120 at the front 101 of the rack 100.

Figure 3:
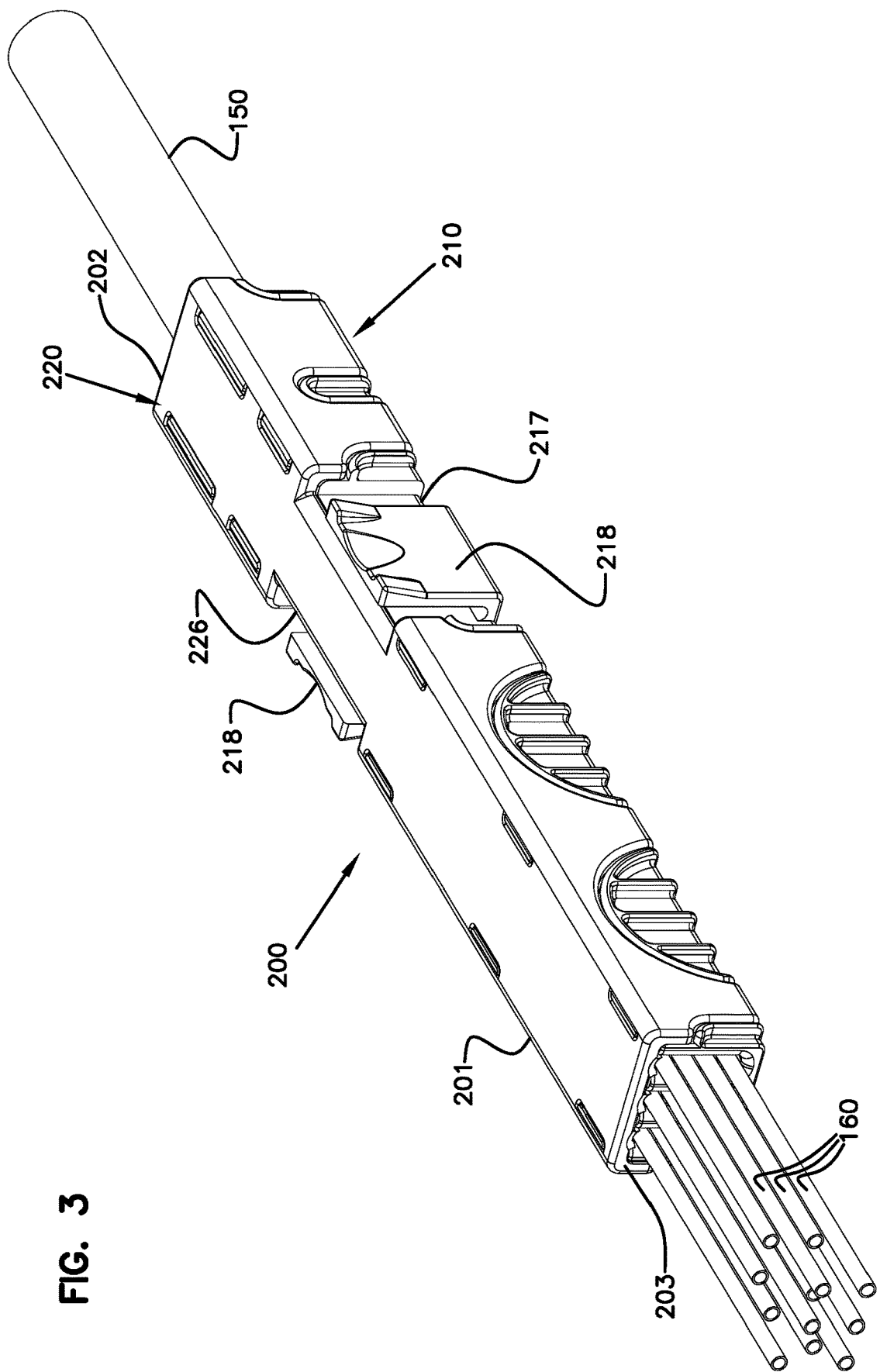
FIG. 3 is a top perspective view of an example break-out assembly.
Figure 4:
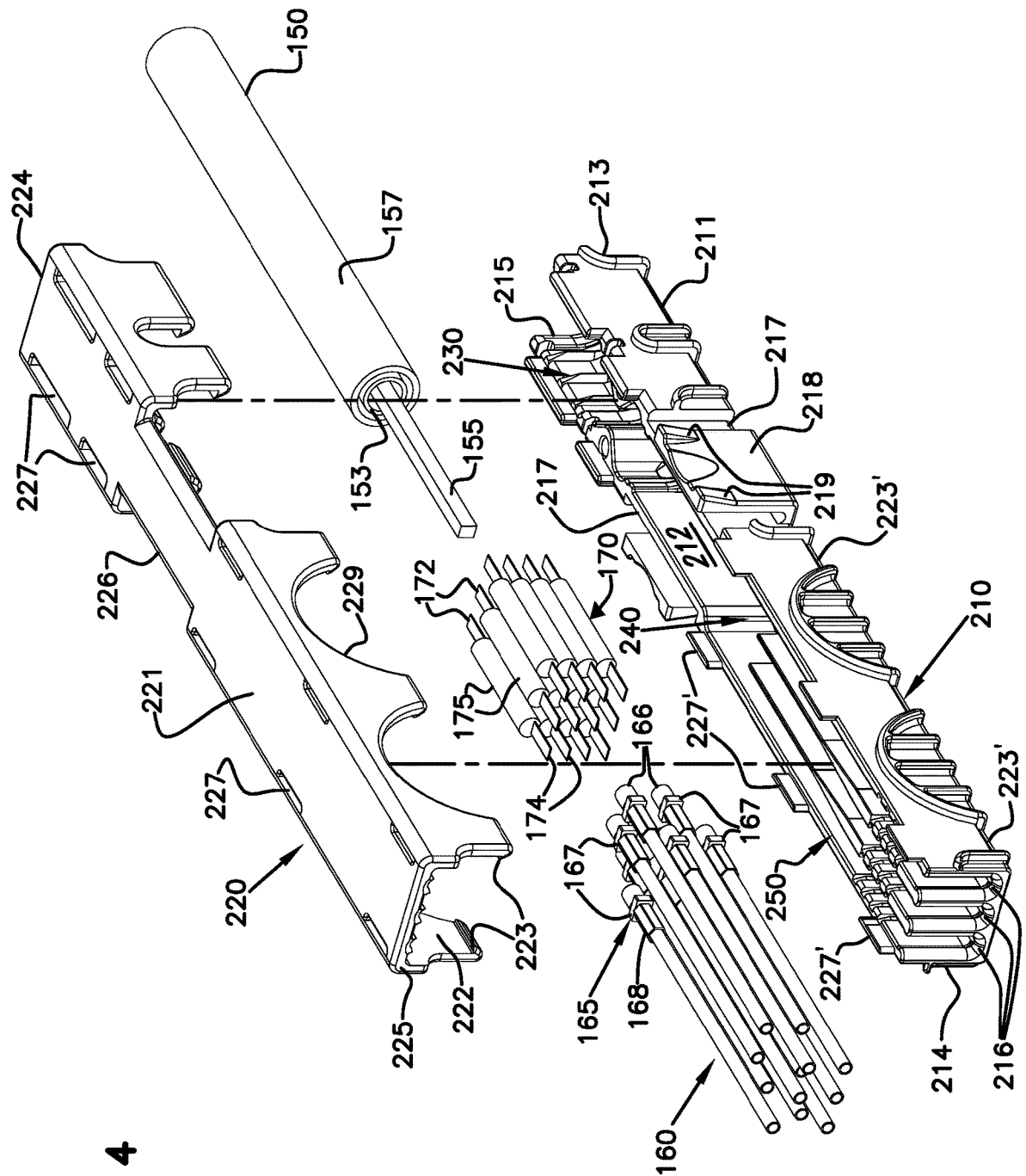
FIG. 4 is an exploded view of the break-out assembly of FIG. 3.
Figure 5:
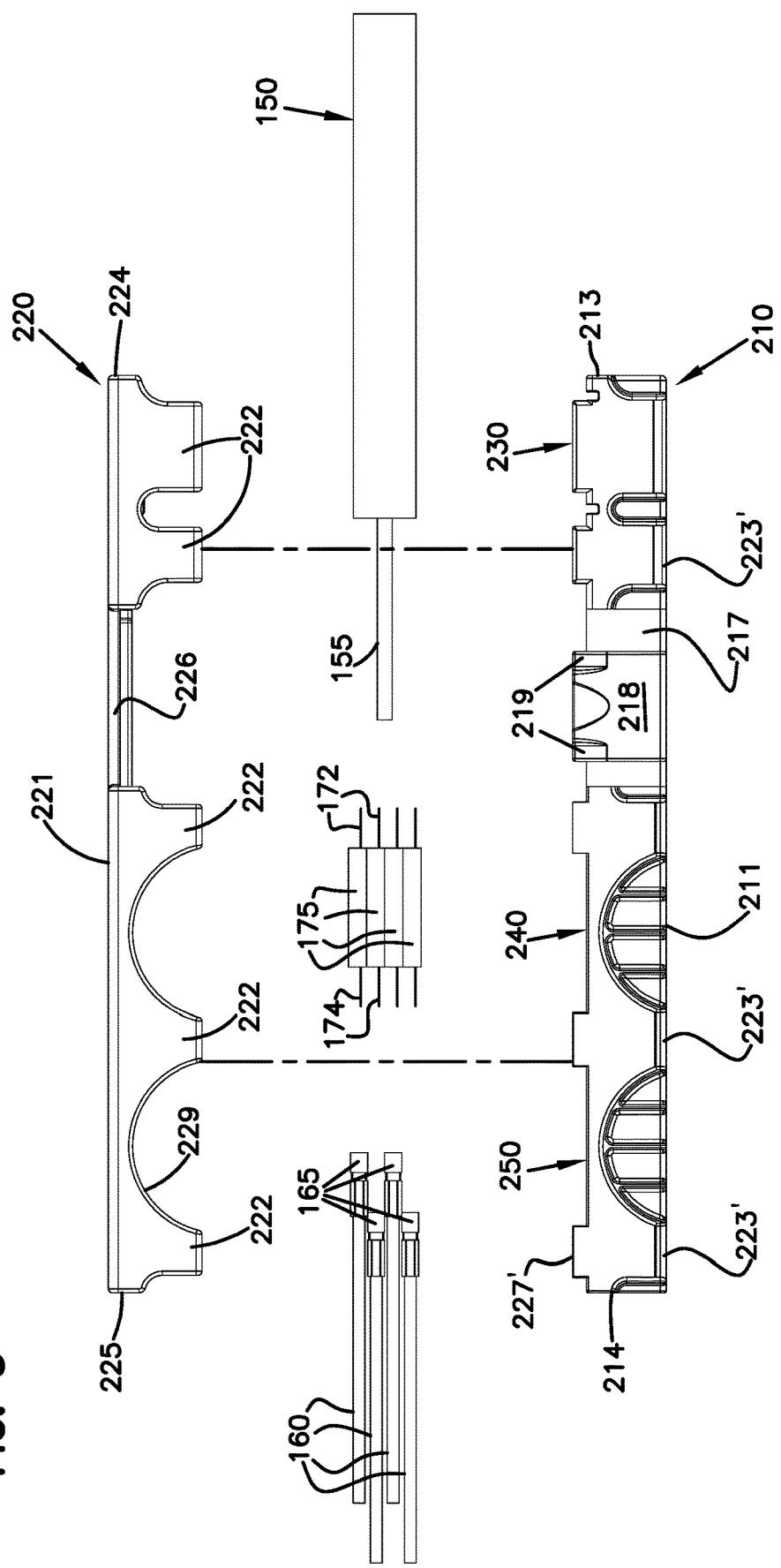
FIG. 5 is a side elevational view of the exploded break-out assembly of FIG. 4.
Figure 8:
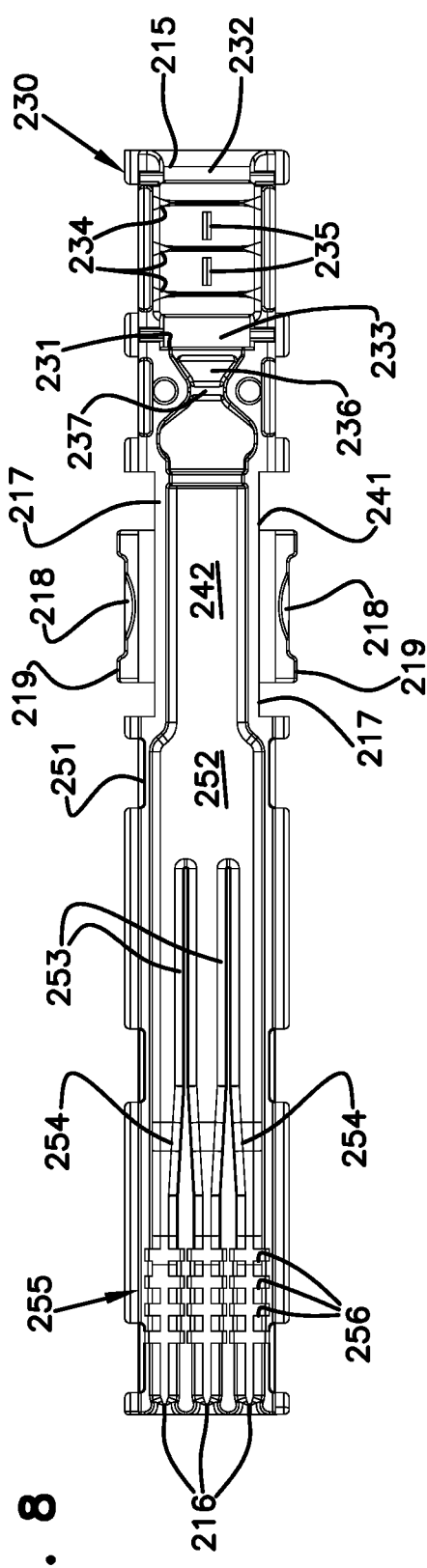
FIG. 8 is a top plan view of the base of FIG. 6.
Figure 10:
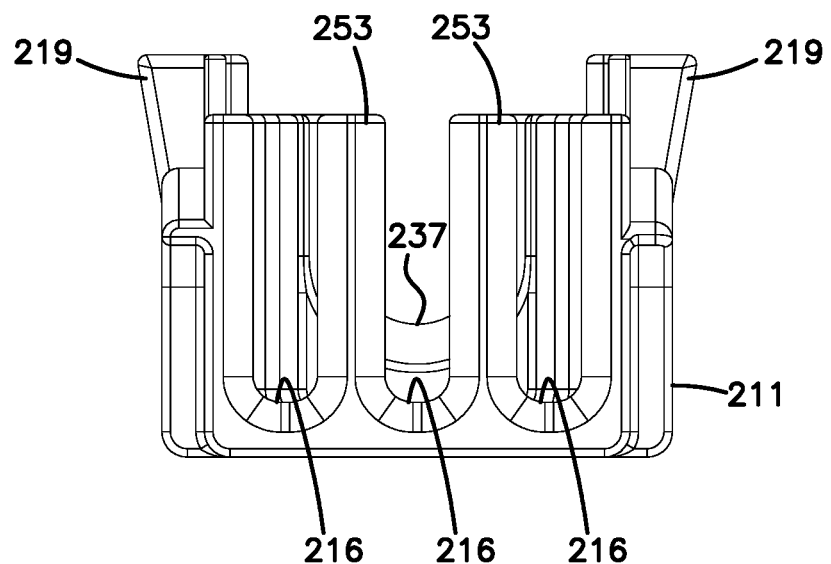
FIG. 10 is a second end view of the base of FIG. 6.
Figure 9:
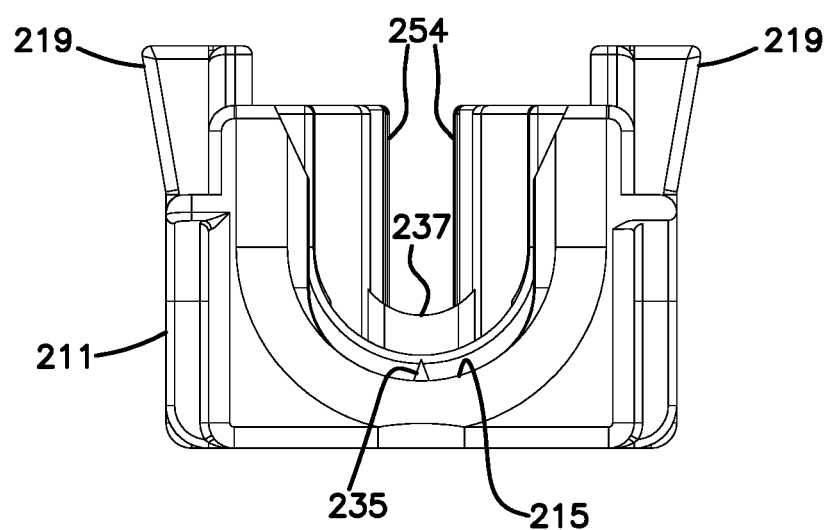
FIG. 9 is a first end view of the base of FIG. 6.
Figure 11:
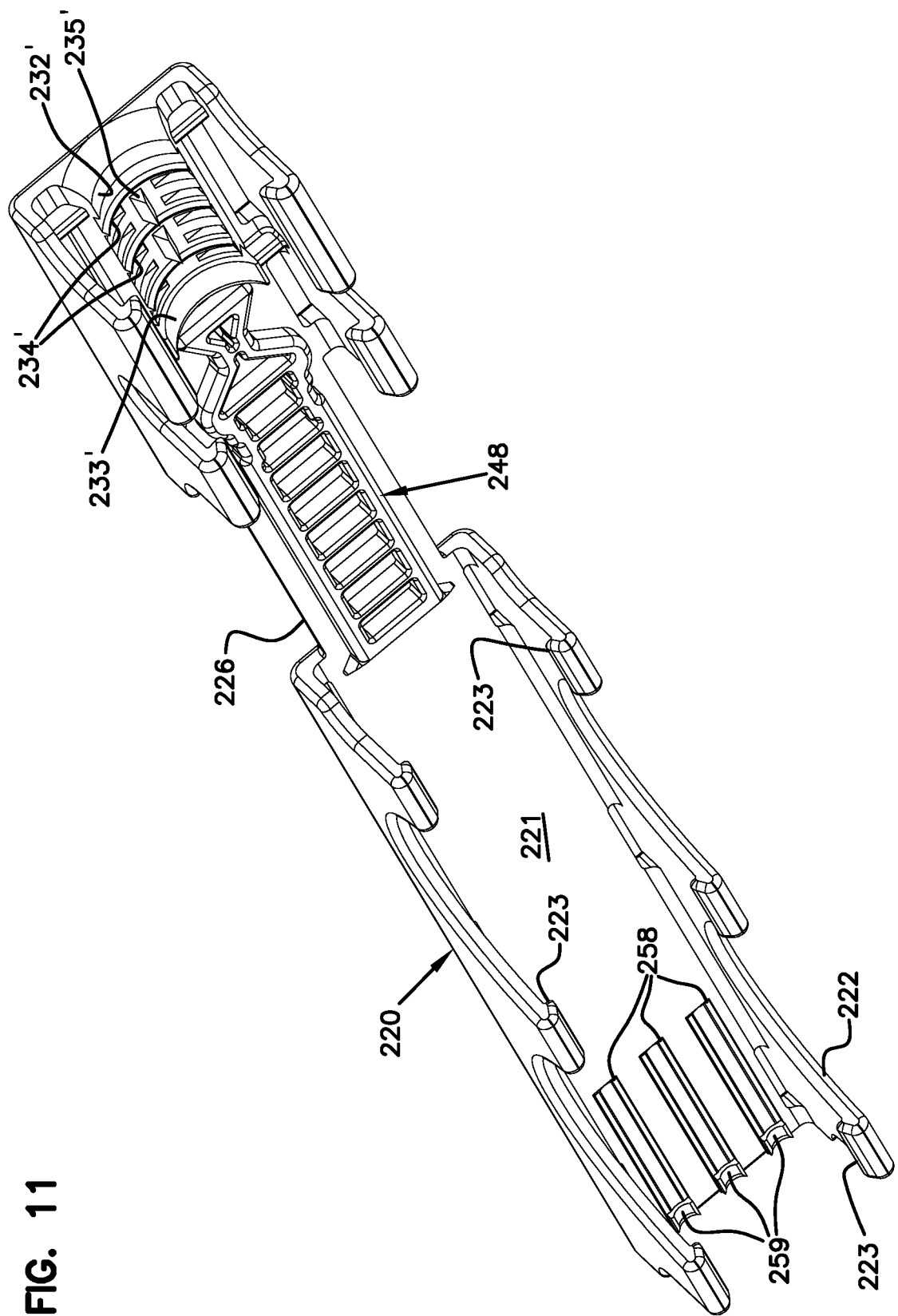
FIG. 11 is a bottom perspective view of a cover of the break-out assembly of FIG. 3.
Figure 12:
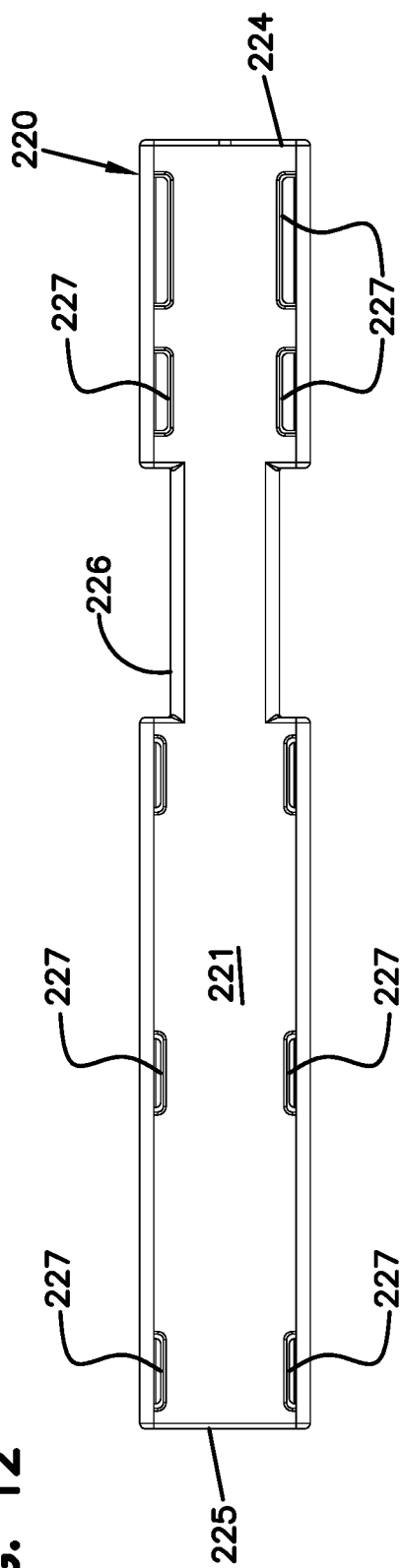
FIG. 12 is a top plan view of the cover of FIG. 11.
Figure 13:
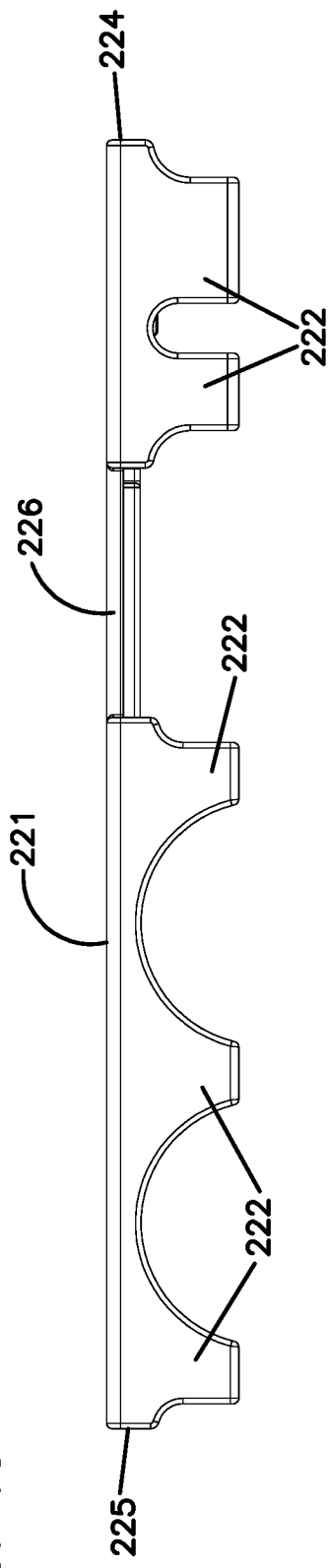
FIG. 13 is a side elevational view of the cover of FIG. 11.
Figure 17:
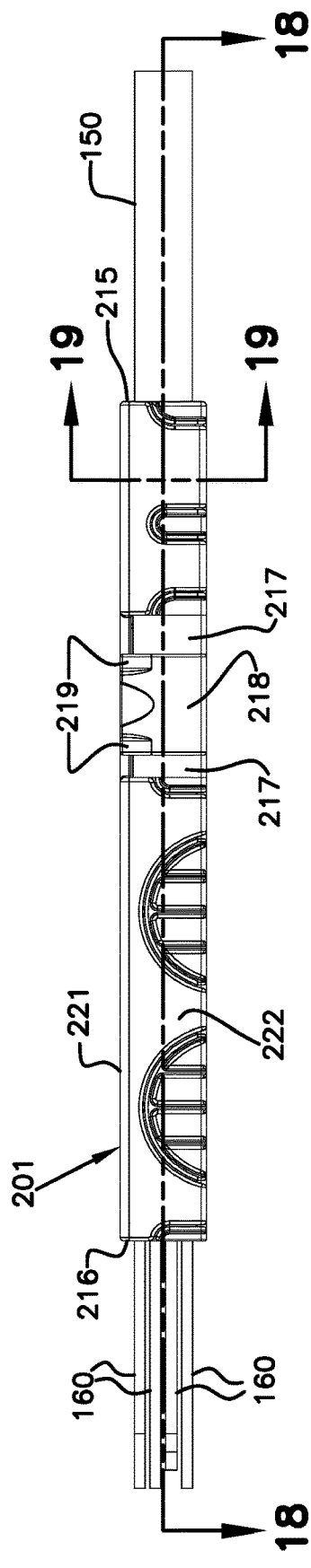
FIG. 17 is a side elevational view of the break-out assembly of FIG. 3.

FIGS. 3-5 illustrate one example break-out assembly 200 that is suitable for transitioning the optical cables 150 to one or more break-out cables 160. In some implementations, fibers of the optical cable 150 are optically spliced to fibers of the break-out cables 160. In some implementations, the fibers of the optical cable 150 are optically coupled to the fibers of the break-out cables 160 using mass-fusion splices. The optical splices 175 are stored at the break-out assembly 200. As shown in FIGS. 1 and 2, one or more of the break-out assemblies 200 can be mounted to the rack 100 at the transition region 130. An example mounting assembly for securing the break-out assemblies 200 to the rack 100 is shown in more detail herein with reference to FIGS. 23-27.

As shown in FIG. 3, the break-out assembly 200 includes an enclosure 201 that defines a first port 202 and a second port 203. An optical cable 150 enters the enclosure 201 at the first port 202 and the break-out cables 160 exit the enclosure 201 at the second port 203. The enclosure 201 defines an interior at which the optical splices 175 can be stowed. In certain implementations, the optical cable 150 is axially and/or rotationally fixed to the enclosure 201 as will be described in more detail herein. In certain implementations, the break-out cables 160 are axially and/or rotationally fixed to the enclosure 201 as will be described in more detail herein.

As shown in FIGS. 4 and 5, the enclosure 201 includes a base 210 and a cover 220 that is separable from the base 210. The base 210 includes a body 211 that defines an interior 212 in which optical components (e.g., the optical splices 175) can be stowed. The base body 211 defines an open top that provides access to the interior 212. The base body 211 extends from a first end 213 to a second end 214. The first end 213 defines a first opening or channel 215 that leads to the interior 212 and the second end 214 defines one or more openings or channels 216 that lead to the interior 212.

The cover 220 is configured to releasably secure to the base 210. In some implementations, the cover 220 includes a cover member 221 from which sidewalls 222 extend downwardly. The cover member 221 is sized to extend over at least a majority of the open top of the base body 211 to enclose the interior 212 of the base 210. The cover 220 extends between a first end 224 and a second end 225. The first end 224 of the cover 220 cooperates with the first end 213 of the base body 211 to define the first port 202 when the cover 220 is mounted to the base 210. The second end 225 of the cover 220 cooperates with the second end 214 of the base body 211 to define the second port 202 when the cover 220 is mounted to the base 210.

The interior of the enclosure 210 defines three regions between the ports 201, 202: a first cable retaining region 230, a splice retaining region 240, and a second cable retaining region 250. The optical cable 150 is secured to the enclosure 201 at the first cable retaining region 230. The break-out cables 160 are secured to the enclosure 201 at the second cable retaining region 250. The optical splices are disposed in the splice retaining region 240.

FIGS. 6-10 illustrate one example base 210 suitable for use in the break-out assembly 200. The base body 211 is elongated along a longitudinal axis L (FIG. 7) between the first and second ends 213, 214. The first port 215 leads into the first cable retaining region 230. A stop surface 231 is recessed inwardly from the first port 215 within the first cable retaining region 230. The stop surface 231 faces towards the first port 215. The stop surface 231 defines an opening or passage sufficiently large to enable at least a ribbon matrix 155 of the optical cable 150 to pass therethrough. The opening or passage in the stop surface 231 is sufficiently small that an end of the jacket 157 of the optical cable 150 will engage the stop surface 231 when the optical cable 150 is mounted at the first cable retaining region 230.

The base body 211 defines one or more support surfaces at the first cable retaining region 230. In the example shown, the base body 211 defines a first support surface 232 at the first end 213 and a second support surface 233 spaced inwardly from the first end 213. The support surfaces 232, 233 inhibit wiggling or other such movement of the optical cable 150 when the optical cable 150 is mounted at the first cable retaining region 230. In some implementations, the support surfaces 232, 233 are generally flat and extend between sidewalls of the base body 211. In other implementations, the support surfaces 232, 233 do not taper towards or away from the longitudinal axis L of the base body 211.

One or more retention members 234 are disposed between the port 215 and the stop surface 231. The retention members 234 inhibit axial movement of the optical cable 150. For example, the retention members 234 may taper to an edge that bites into the jacket 157 of the optical cable 150. In some implementations, the retention members 234 are disposed between the support surfaces 232, 233. In certain implementations, the retention members 234 extend upwardly from a bottom of the base body 211. In certain implementations, the retention members 234 extend inwardly from the sidewalls of the base body 211. In certain implementations, the retention members 234 define partial rings around the base body 211. In the example shown, three retention members 234 are disposed at the first cable retaining region 230. In other implementations, however, a greater or lesser number of retention members 234 (e.g., one, two, four, etc.) can be provided.

In some implementations, one or more teeth 235 also can be disposed between the port 215 and the stop surface 231. The teeth 235 inhibit rotational (i.e., torsional) movement of the optical cable 150. For example, the teeth 235 may taper to an edge that bites into the jacket 157 of the optical cable 150. In some implementations, the teeth 235 are disposed between the support surfaces 232, 233. In certain implementations, the teeth 235 are disposed between the retention members 234. In the example shown, two teeth 235 are each disposed between adjacent pairs of retention members 234. In other implementations, a greater or lesser number of teeth 235 (e.g., one, three, etc.) can be disposed at the first cable retention region 230. Each tooth 235 defines at least one ramped surface that faces towards one of the sidewalls of the base body 211. In certain implementations, the teeth 235 face in a common direction.

In some implementations, the first cable retention region 230 defines a pocket 236 configured to hold epoxy or RTV that is applied on the ribbon matrix 155 of the optical cable 150. In certain implementations, the pocket 236 is disposed at the stop surface 231 so that the epoxy can be applied adjacent the jacket 157 of the optical cable 150. The pocket 236 is defined by at least one barrier wall 237 that extends upwardly from the bottom of the base body 211 to inhibit overflow or leakage of the epoxy to the splice retaining region 240 of the base body 211. In certain implementations, the pocket 236 is defined between two barrier walls 237. In certain implementations, the pocket 236 is partially defined by a "necked in" section of the base body 211 having a reduced cross-dimension within the interior 212 of the base body 211.

The base 210 is configured to be releasably coupled to a bracket 231 as will be described in more detail herein. In some implementations, the base body 211 defines a narrow section 217 having a reduced cross-dimension relative to the rest of the base body 211. A flexible latch suitable for coupling the enclosure 201 to the bracket 231 can be mounted at the narrow section 217. The latch includes two latch members 218 disposed at opposite sides of the base body 211. The reduced cross-dimension of the narrow section 217 enables free ends of the latch members 218 to flex towards each other. Ramps 219 are disposed at the free ends of the latch members 218. In the example shown, the each latch member 218 includes two ramps 219 at opposite ends of the latch members 218 (e.g., see FIG. 4).

FIGS. 11-16 illustrate one example cover 220 suitable for use in the break-out assembly 200. The cover 220 is elongated along a longitudinal axis between the first and second ends 224, 225. The cover member 221 includes a narrow section 226 of reduced cross-dimension compared to the rest of the cover member 221. The narrow section 226 generally aligns with the narrow section 217 of the base body 211 so that the latch members 218 extend upwardly on opposite sides of the narrow section 226. The reduced cross-dimension provides space for the latch members 218 to flex towards each other. In certain implementations, ribs 248 can be provided at the narrow section 226 for strength.

The sidewalls 222 extending from the cover member 221 are sized to extend over the sidewalls of the base body 211. Latching hooks 223 are provided at distal ends of the sidewalls 222. The latching hooks 223 are configured to latch to recesses 223' defined in an exterior of the base body 211. For example, the recesses 223' may be defined at a bottom of the base body 211 (see FIGS. 4 and 5). In certain implementations, the cover sidewalls 222 define recesses or cutout sections that fit around exterior protrusions or other exterior structures on the base body 211. In the example shown, the cover sidewalls 222 define semi-circle shaped cutouts.

In some implementations, the cover member 221 and the base body 211 include alignment features that are configured to position the cover 220 relative to the base 210 to enclose the interior 212 of the base body 211. In certain implementations, one of the base body 211 and cover member 221 includes tabs and the other of the base body 211 and the cover member 221 defines holes sized to receive the tabs. In the example shown, the cover member 221 defines holes 227 and the base body 211 includes tabs 227' that extend upwardly from the open top of the base body 211 (see FIG. 4).

An interior surface of the cover member 221 is configured to cooperate with the base body 211 to further define the first cable retention region 230, splice retention region 240, and second cable retention region 250. For example, in some implementations, the cover member 221 can form one or more stop surfaces 232', 233' that align with stop surfaces 232, 233 of the base body 211 to facilitate holding the optical cable 150. The cover member 221 also can include one or more retention members 234' that cooperate with the retention members 234 of the base body 211 to inhibit axial movement of the optical cable 150. One or more teeth 235' also can be disposed at the cover member 221 to cooperate with the teeth 235 of the base body 211 to inhibit rotational/torsional movement of the optical cable 150.

One or more channels 258 are provided towards the second end 225 of the interior surface of the cover member 221. The channels 258 generally align with the passages between the walls 253 of the base body 211. Accordingly, the channels 258 aid in routing the break-out cables 160 out of the enclosure 201. In certain implementations, the channels 258 include raised sections 259 that partially define the ports 216. In some implementations, the channels 258 extend along only part of the length of the walls 253 of the base body 211. In other implementations, the channels 258 can be the same length or a greater length than the walls 253.

Figure 18:
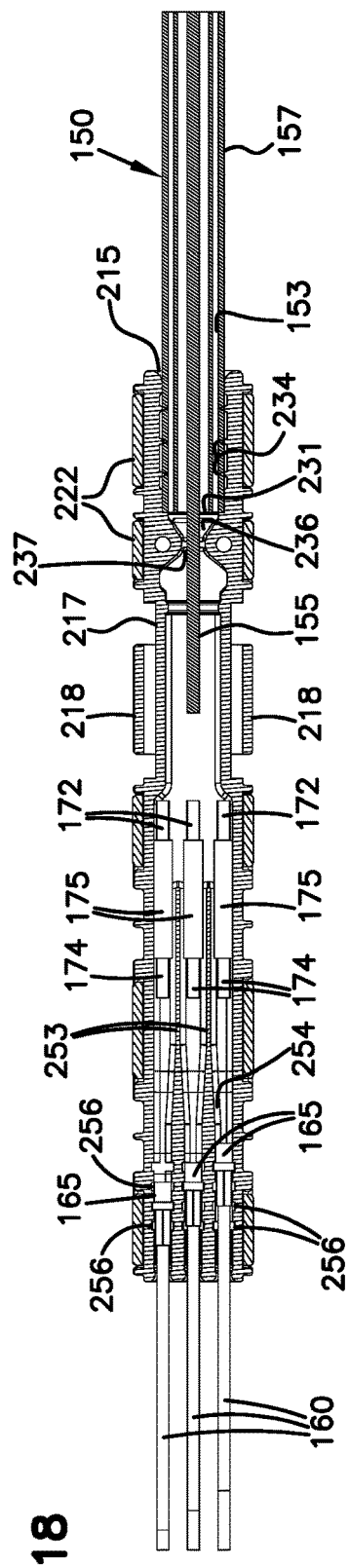
FIG. 18 is a longitudinal cross-section of the break-out assembly of FIG. 17 taken along the 18-18 section line.
Figure 19:
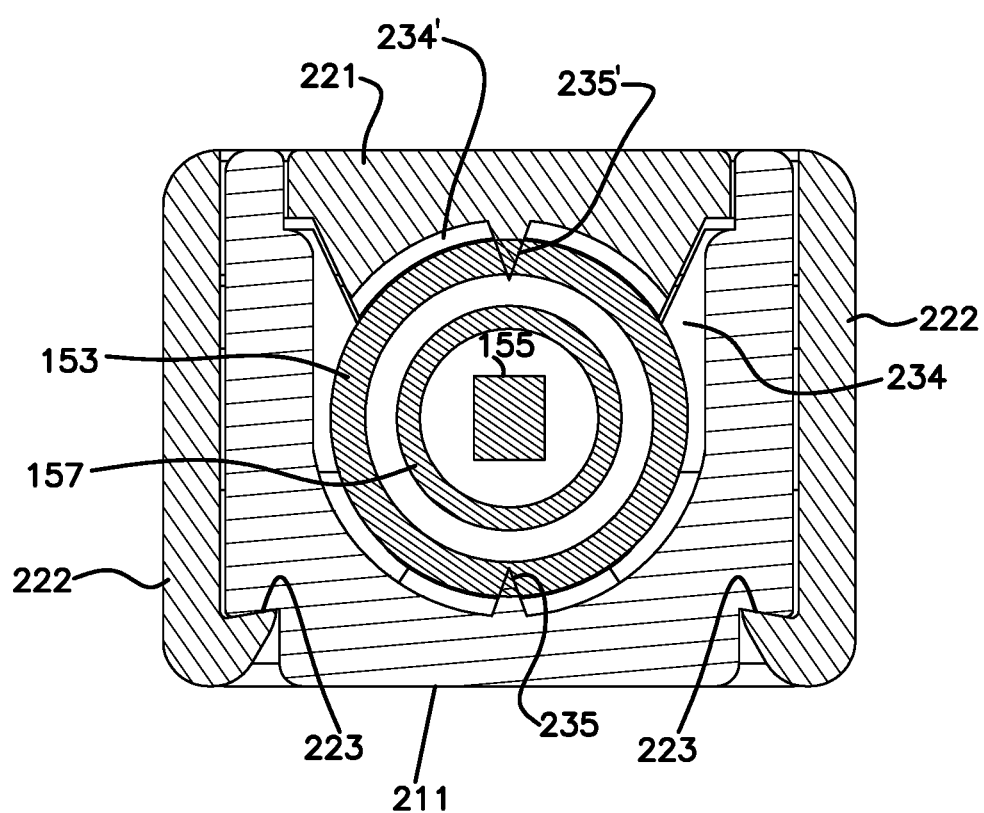
FIG. 19 is a transverse cross-section of the break-out assembly of FIG. 17 taken along the 19-19 section line.

FIGS. 17-21 illustrate an assembled enclosure 201 holding a plurality of mass fusion splices 175 at the splice retention region 240. The optical cable 150 is shown held at the first cable retaining region 230 and break-out cables 160 are shown held at the second cable retaining region 250. In FIG. 18, a longitudinal cross-section of the enclosure 201 shows the cables 150, 160 and splices 175 disposed within the base body 211. FIG. 19 is a transverse cross-section of the enclosure 201 showing the optical cable 150 at the first cable retention region 230. FIG. 21 is a longitudinal cross-section of the enclosure 201 showing the cables 150, 160 and splices 175 disposed between the base 210 and cover 220.

As shown in FIGS. 18 and 21, first ribbonized portions 172 of the spliced fibers extend from a first end of the mass fusion splices 175 and second ribbonized portions 174 of the spliced fibers extend from a second end of the mass fusion splices 175 (see also FIG. 4). It will be understood that the first ribbonized portions 172 are formed from the optical fibers of the optical cable 150 and the second ribbonized portions 174 are formed from the optical fibers of the break-out cables 160. For example, the optical cable 150 may include a ribbon matrix 155 that is separated into individual fiber ribbons 172 and optical fibers of the break-out cables 160 can be ribbonized before being spliced to the individual fiber ribbons 172. To enhance clarity of the drawings, the connecting portions between the ribbonized portions 172, 174 and the cables 150, 160 are not shown.

The optical cable 150 is held at the first cable retention region 230. The jacket 157 extends through the port 215 and abuts against the stop surface 231. In the example shown in FIGS. 18 and 21, a buffer tube 153 within the jacket 157 also stops at the stop surface 23. Retention members 234, 234' are shown biting into the outer jacket 157 (see FIGS. 18 and 19). Teeth 235, 235' also are shown biting into the jacket 157 to inhibit rotational/torsional movement of the cable 150 (FIGS. 19 and 21). The ribbon matrix 155 extends past the stop surface 231, through a pocket 236 that is partially defined by inwardly tapered walls, and towards the splice retention region 240 (FIGS. 18 and 21). Epoxy or other adhesive can be applied to the ribbon matrix 155 at the pocket 236 to hold the ribbon matrix 155 in place. Barrier wall 237 retains the epoxy within the pocket 236.

The break-out cables 160 are held at the second cable retention region 250 (FIGS. 18 and 21). Jacketed or buffered portions of the cables 160 extend into the enclosure 201 through ports 216. Crimp arrangements 165 are disposed on each break-out cable 160. In some implementations, the crimp arrangements 165 include a crimp ring 168 that mounts at least partially over a crimp base 166. The optical fibers of each break-out cable 160 extend through a crimp base 166. In some implementations, the optical fibers can include a fiber ribbon. In other implementations, only a portion of the optical fibers is ribbonized at the splice 175. The jackets of the break-out cables secure between the respective crimp bases 166 and the crimp sleeves 168.

The crimp arrangements 165 are configured to secure axially and rotationally to the enclosure 201 at the second cable retention region 250. Each crimp arrangement 165 includes wings or flanges 167 (FIG. 4) that extend radially/laterally outwardly from the crimp arrangement 165. The walls 253 at the second cable retention region 250 define slots 256 at which the wings or flanges 167 can seat (FIG. 4). For example, the wings or flanges 167 can slide into slots 256 defined in adjacent walls 253 (FIG. 18). In certain implementations, the wings or flanges 167 define one or more flat sides to inhibit rotation of the crimp arrangements 165 within the slots 256.

In some implementations, the walls 253 are sufficiently long that multiple slots 256 may be formed in each wall 253. Accordingly, the second cable retention region 250 provides securement locations for the crimp arrangements 165 at multiple axial locations along the walls 253 (compare the crimp arrangements of FIG. 18). By providing multiple axial locations for the crimp arrangements 165, the second cable retention region 250 facilitates retention of break-out cables 160 having different slack lengths of fibers between the crimp arrangements 165 and the splices 175. Accordingly, a splice 175 can be redone/reworked by cutting of the spliced portion of the break-out cable fiber and re-splicing the shortened break-out cable fiber. As the break-out cable fiber is shortened through re-work, the crimp arrangement 165 can be moved to a more inwardly located pair of slots 256.

In some implementations, the walls 253 and slots 256 are sufficiently high that the same slot 256 can receive multiple crimp arrangements 165. For example, two or more crimp arrangements 165 may vertically stack at the same set of slots 256. In the example shown in FIG. 21, four crimp arrangements 167 may be stacked between each adjacent pair of walls 253. In other implementations, the walls 253 and slots 256 can be sized to receive a greater or lesser number of crimp arrangements 165 (e.g., one, two, three, five, six, etc.). In certain implementations, the axially spaced slots 256 can located sufficiently close to each other that a crimp arrangement 165 mounted at one axial location can stack onto another crimp arrangement 165 mounted at another axial location between the same walls 253. In certain implementations, a crimp arrangement 165 mounted at an outward-most axial location can stack onto another crimp arrangement 165 mounted at an inward-most axial location.

As shown in FIGS. 18 and 21, one or more splices 175 are disposed at the splice retention region 240 of the enclosure 201. In some implementations, at least a portion of at least one of the splices 175 is located between the walls 253 (FIG. 18). In certain implementations, the walls 253 define tapered sections 254 that taper inwardly as they extend into the enclosure 201. In some implementations, the splices 175 can be arranged in a stacked configuration 170. For example, two or more splices 175 can be stacked between adjacent pairs of walls 253. In the example shown in FIG. 21, four splices 175 can be stacked between each adjacent pairs of walls 253. In other implementations, a greater or lesser number of splices 175 can be stacked.

The ribbon matrix 155 of the optical cable 150 can be divided into multiple ribbons that extend to the splices 175. In various implementations, the ribbons of the ribbon matrix 155 can be routed to the splices 175 in different orders. FIGS. 22A-22C schematically illustrate three example stacked configurations 171-173 for the splices 175 disposed at the splice retention region 240. In FIGS. 22A-22C, each splice 175 is numbered "1" through "12" to identify corresponding consecutive ribbon in the ribbon matrix 155 that are optically coupled to break-out cable fiber ribbons at the splice 175. Each stacked configuration 171-173 provides a different possible arrangement of the fiber ribbons from the ribbon matrix 155.

In FIG. 22A, a bottom-most fiber ribbon is positioned at a bottom, right side of the first stacked configuration 171. The next fiber ribbon in the matrix 155 is stacked above the bottom-most ribbon. The next two fiber ribbons are disposed in an adjacent (e.g., central) passage between the walls 253 and the following two fiber ribbons are disposed in yet another adjacent (e.g., left) passage between a wall 253 and the base body 211. The remaining six ribbons are stacked on top of the first six ribbons in the same pattern (e.g., right, center, left) until the top-most ribbon is positioned at the top, left side of the first stacked configuration 171.

The last six ribbons of the second stacked configuration 172 of FIG. 22B follow the same pattern as the last six ribbons of the first stacked configuration 171. However, the second stacked configuration 172 differs from the first stacked configuration 171 in that the first six ribbons start at the bottom, left side of the configuration 172. In the third stacked configuration 173 of FIG. 22C, the ribbons of the matrix 155 are stacked in one of the side passages until the passage is full. Subsequent ribbons in the matrix 155 are stacked in an adjacent passage. The pattern is repeated until the passages are full.

Figure 23:
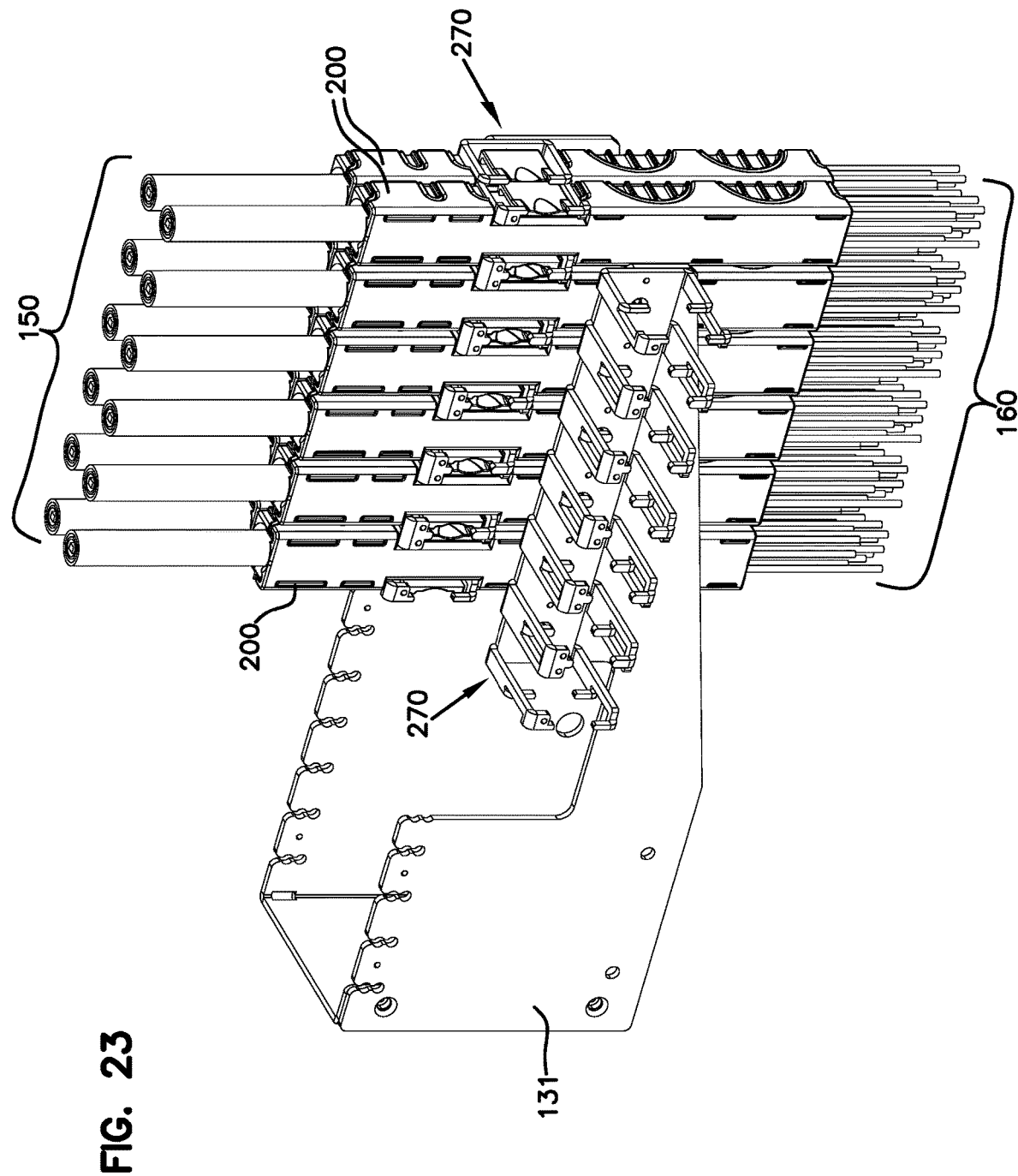
FIG. 23 is a perspective view showing break-out assemblies mounted to a first bracket at a bracket frame and showing an empty second bracket mounted to the frame.
Figure 24:
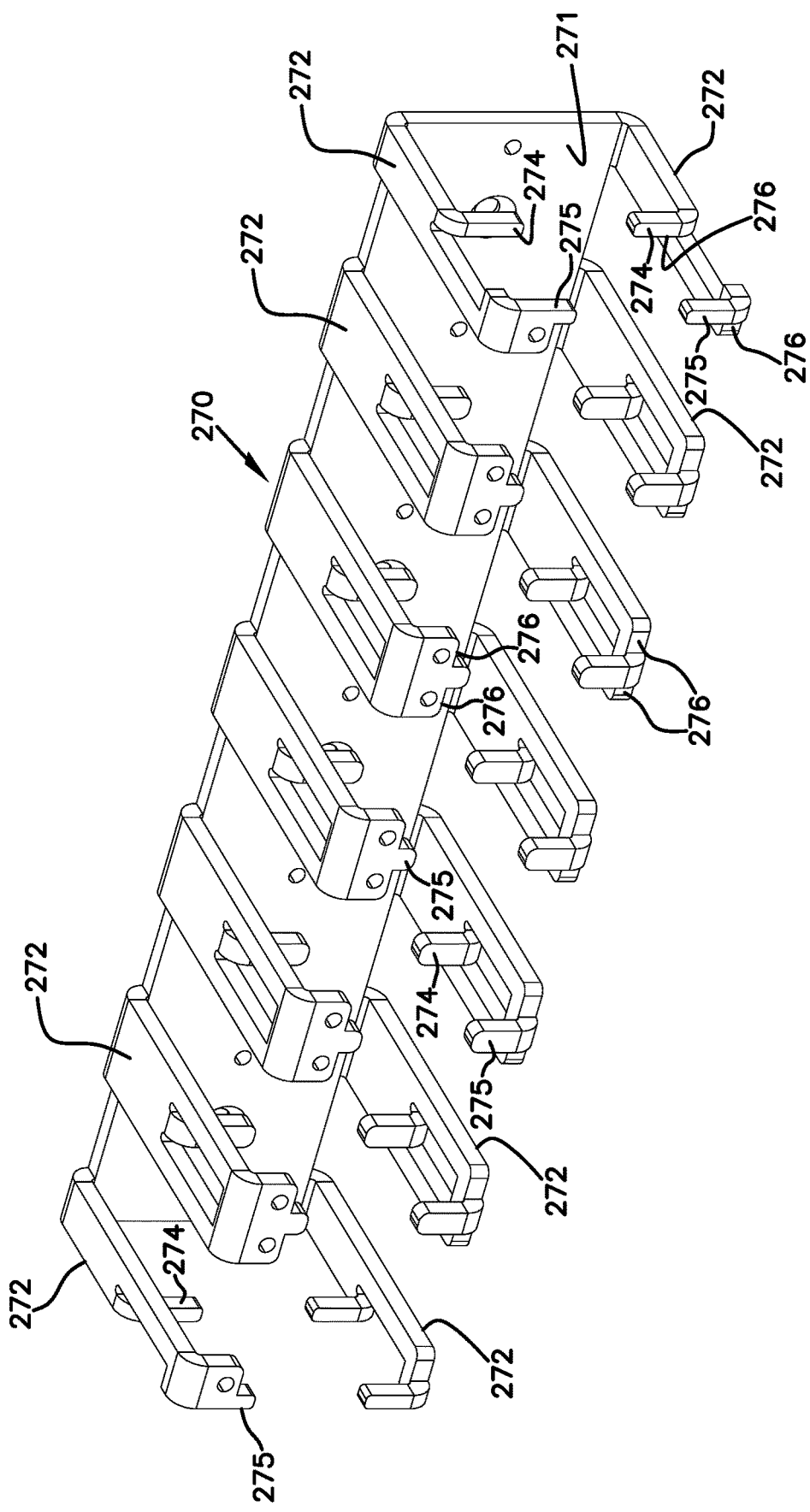
FIG. 24 is a perspective view of one of the brackets of FIG. 23.
Figure 25:
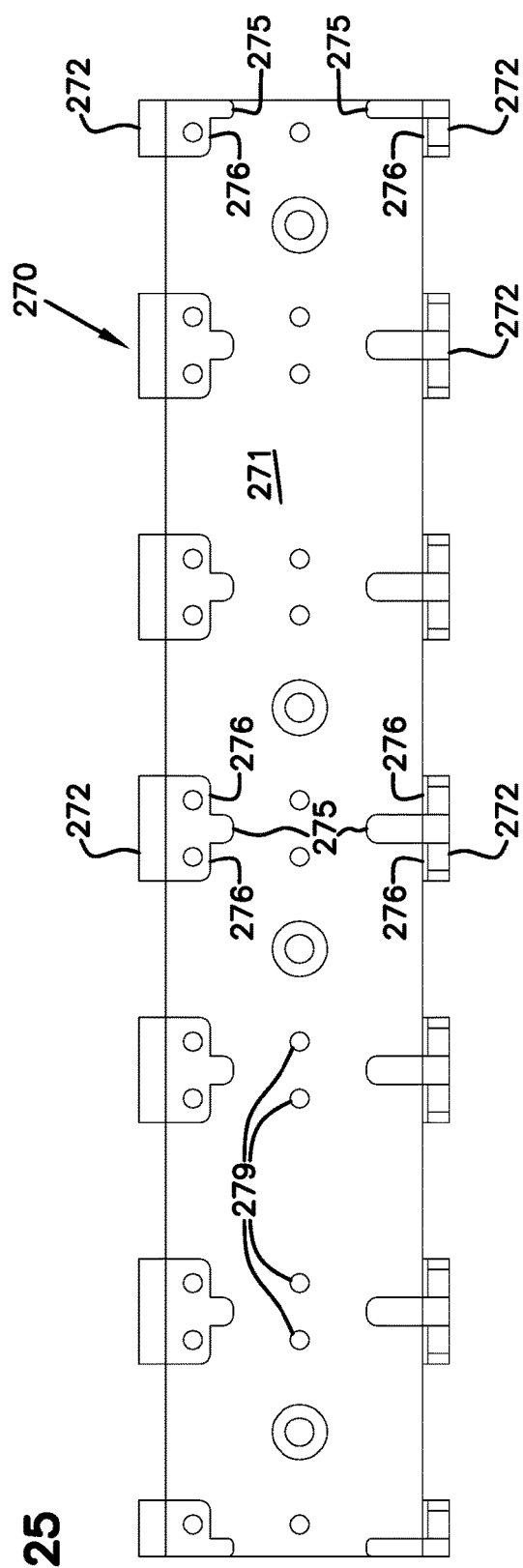
FIG. 25 is a side elevational view of the bracket of FIG. 24.

FIGS. 23-27 show how the splice assemblies 200 can be mounted to the frame 100 shown in FIGS. 1 and 2. As shown in FIG. 23, the splice assemblies 200 can be mounted to one or more brackets 270 that are mounted to a bracket frame 131. The bracket frame 131 mounts to the frame 100 (e.g., at the top of the frame 100). In some implementations, multiple brackets 270 mount to one bracket frame 131. For example, the bracket frame 131 can include multiple arms and one bracket 270 can mount to each arm. In other implementations, however, a greater number of brackets 270 can mount to one arm.

The bracket 270 is configured to hold the splice assembly 200 in a vertical orientation so that one port 215, 216 faces upwardly relative to the frame 100 and one port 215, 216 faces downwardly relative to the frame 100. In the example shown, the first port 215 faces upwardly to receive optical cables 150 being routed downwardly towards the frame 100 (e.g., from ceiling mounted fiber tracks) and the second port 216 faces downwardly to facilitate routing the break-out cables 160 to the rest of the frame 100 (e.g., to the termination regions 110).

The bracket 270 defines a plurality of mounting locations 277, 278 at which splice assemblies 200 can be mounted. In some implementations, the bracket 270 defines a single row of mounting locations along a length of the bracket 270. In other implementations, the bracket 270 defines multiple rows of mounting locations. In certain implementations, the bracket includes an inner row of mounting locations 277 and an outer row of mounting locations 278 (see FIG. 26). In other implementations, the bracket 270 may include a greater number of rows of mounting locations. In the example shown in FIG. 27, a first splice assembly 200A is configured to mount at an inner mounting location 277 and a second splice assembly 200B is configured to mount at an outer mounting location 278.

The bracket 270 includes a mounting section 271 that defines mounting openings 279 or other mounting features with which the mounting section 271 can be secured to the bracket frame 131. The mounting locations are defined by arms 272 extending outwardly from opposite sides of the mounting section 271 and fingers 274, 275 extending inwardly from the arms (see FIG. 26). In some implementations, a first row of arms 272 extends from one side of the mounting section 271 and a second row of arms 272 extends from an opposite side of the mounting section 271 to define a U-shaped end view (e.g., see FIG. 26). The arms 272 of each row are longitudinally spaced from each other along the mounting section 271. The arms 272 of the first row laterally align with the arms 272 of the second row to form lateral arm pairs.

Figure 26:
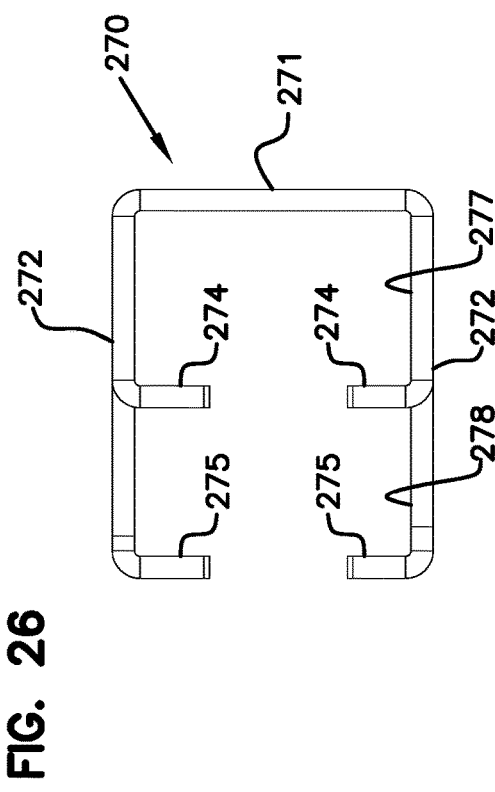
FIG. 26 is an end view of the bracket of FIG. 24.
Figure 27:
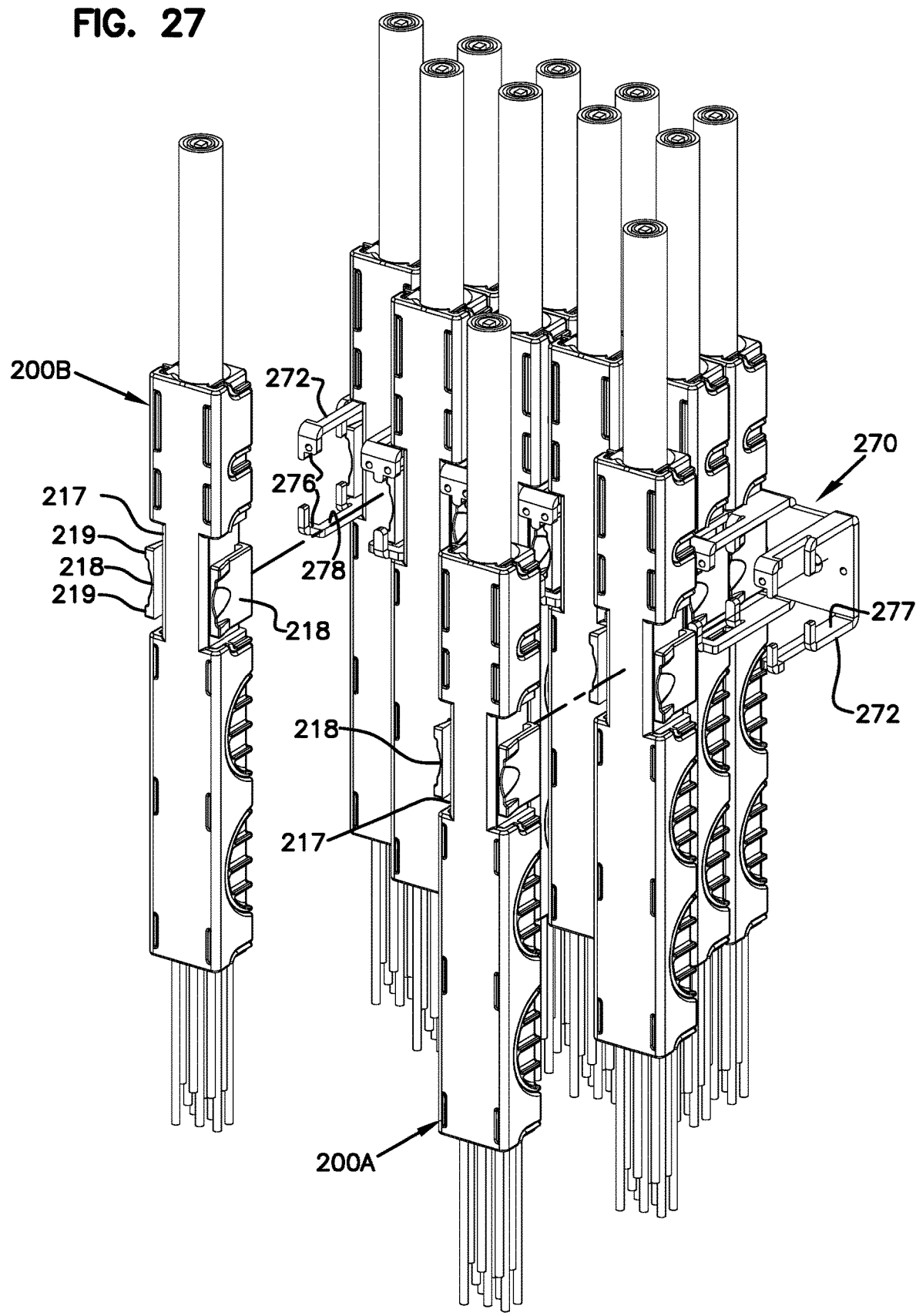
FIG. 27 shows two break-out assemblies exploded outwardly from a bracket.
Figure 28:
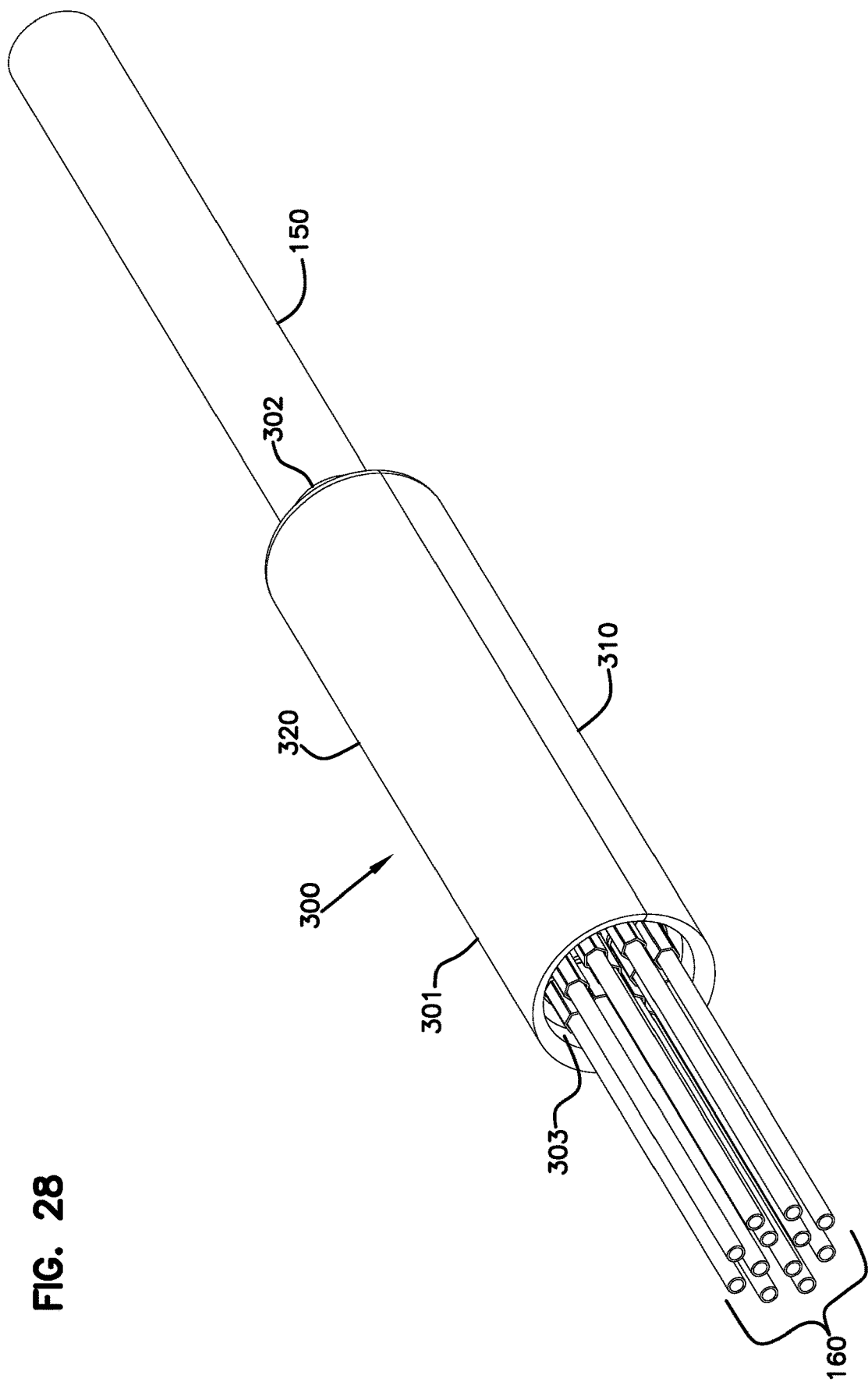
FIG. 28 is a perspective view of another example break-out assembly.
Figure 29:
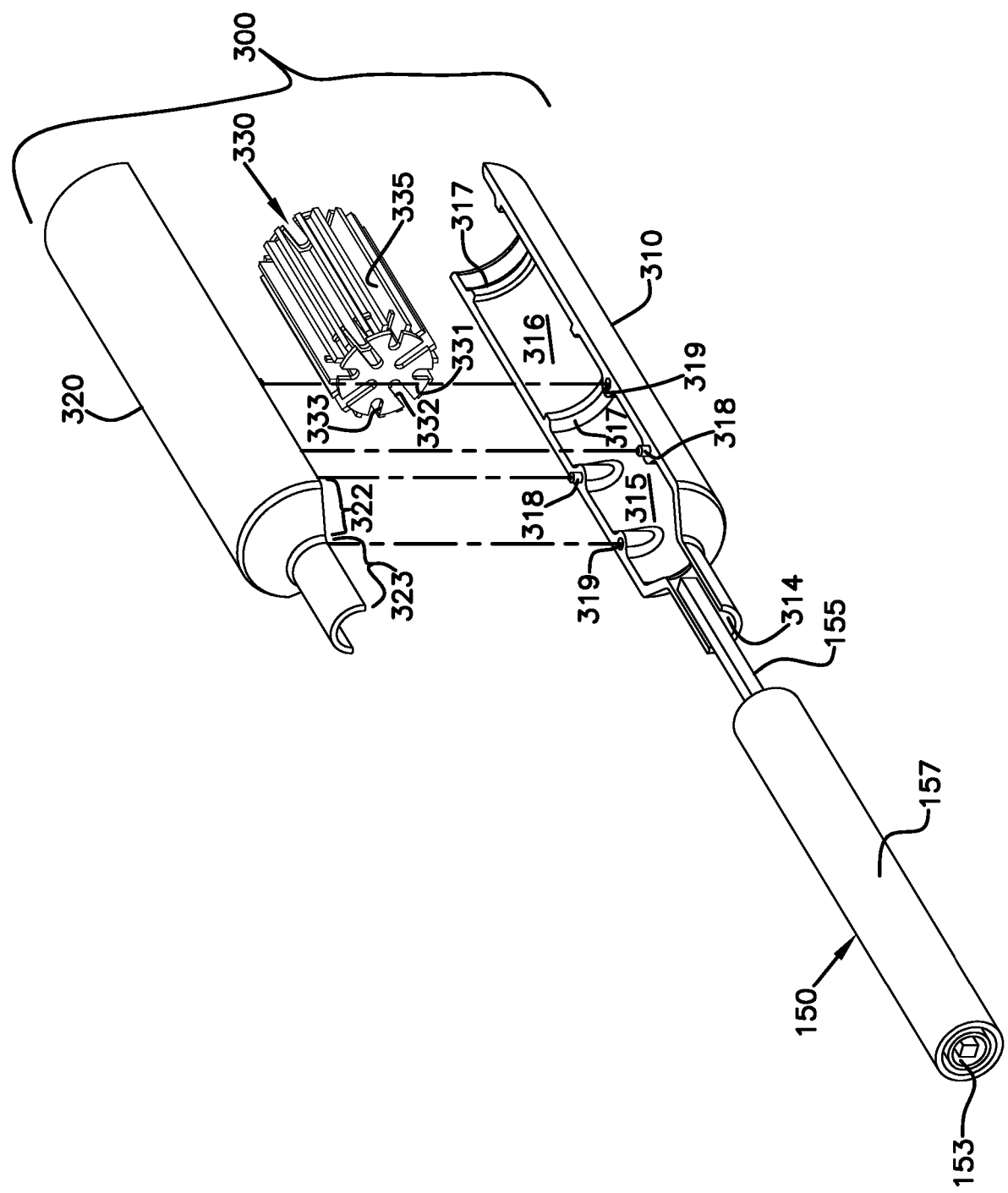
FIG. 29 is a perspective view of the break-out assembly of FIG. 28 showing two enclosure bodies and an organizer exploded outwardly from each other.
Figure 30:
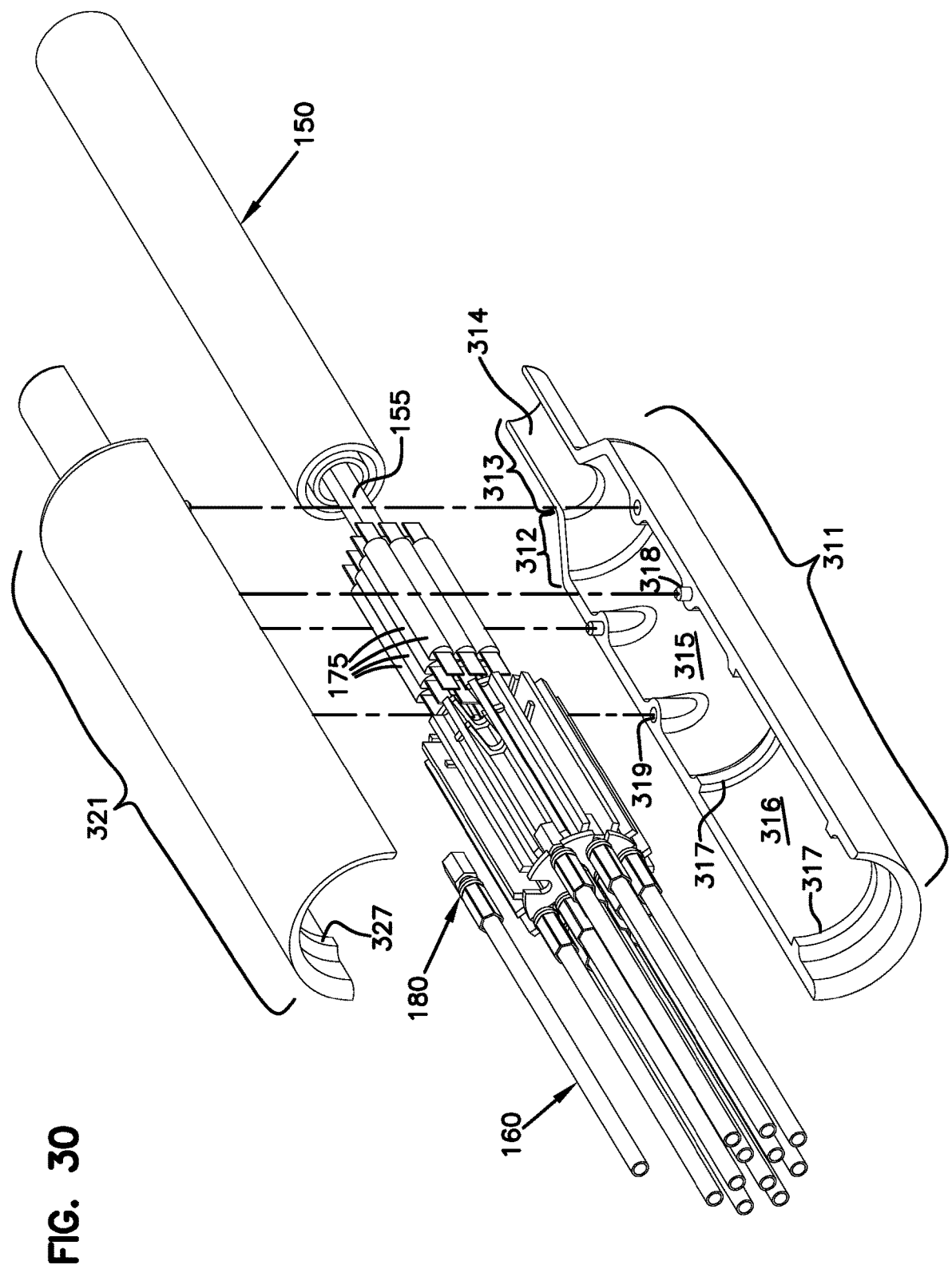
FIG. 30 is a perspective view of the break-out assembly of FIG. 29 also showing the splices exploded from the enclosure bodies and showing break-out cables coupled to the orgranizer.
Figure 31:
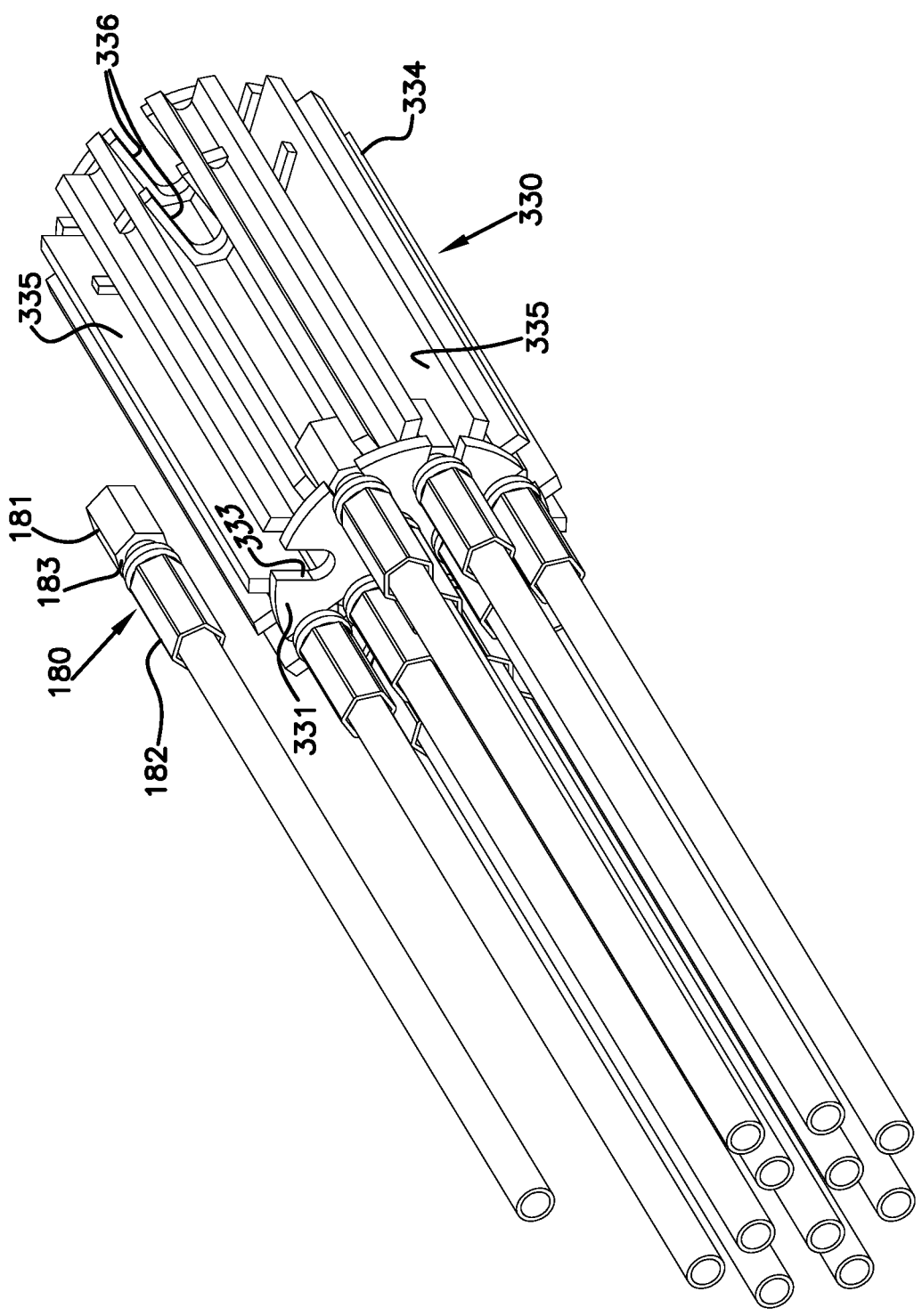
FIG. 31 is a perspective view of the organizer of FIG. 30 shown in isolation with one break-out cable exploded from the organizer.
Figure 32:
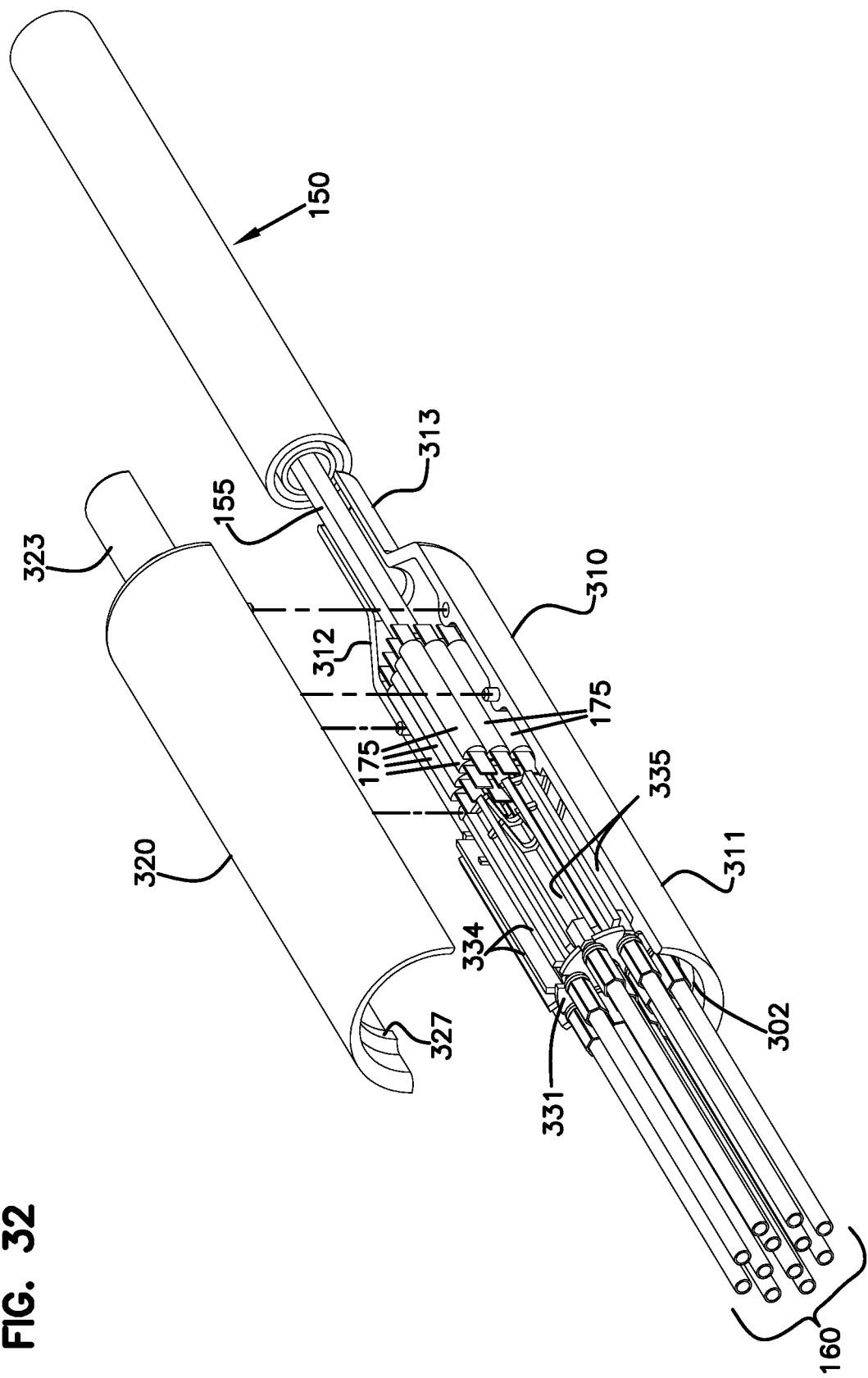
FIG. 32 is a perspective view of the break-out assembly of FIG. 30 with the cables, organizer, and splices disposed in a first of the enclosure bodies and a second of the enclosure bodies exploded outwardly from the first enclosure body.

Each arm 272 includes a first retaining finger 274 and a second retaining finger 275 that extend inwardly from the arm 272 towards the laterally adjacent arm 272. The second retaining finger 275 is disposed at a free end of the arm 272. The first retaining finger 274 is disposed between the mounting section 271 and the second retaining finger 275 (e.g., see FIG. 26). The first retaining fingers 274 of a pair of laterally adjacent arms 272 cooperate to define a first mounting location 277 for a splice assembly 200 (FIG. 26). The second retaining fingers 275 of a pair of laterally adjacent arms 272 cooperate to define a second mounting location 278 for a splice assembly 200 (FIG. 26).

The splice assemblies 200 mount to the bracket 270 in the gaps between the longitudinally spaced arms 272. For example, the narrow sections 217, 226 of the assembly 200 can be positioned between adjacent lateral pairs of arms 272. The arms 272 slide along an exterior of the enclosure 201 at the narrow sections 217, 226 so that the latch members 218 are disposed between the arms 272 of a lateral pair. In the example shown in FIG. 27, the first splice assembly 200A is configured to be inserted between a first lateral pair of arms 272 and a second lateral pair of arms 272 located adjacent the first lateral pair. Each latch member 218 of the first splice assembly 200A is disposed between the arms 272 of the corresponding lateral pair.

The retention fingers 274, 275 that correspond to the mounting location 277, 278 snap-over or otherwise secure to the latch members 218. For example, the latch members 218 may flex inwardly as the ramps 219 cam past the respective retention fingers 274, 275. When the ramps 219 clear the retention fingers 274, 275, the latch members 218 may unflex to their original positions, thereby moving ends of the ramps 219 into engagement with the respective retention fingers 274, 275. Accordingly, the arms 272 and retention fingers 274, 275 cooperate to hold the splice assemblies 200 within the bracket 270. In certain implementations, the break-out assembly 200 is held by the arms 272 of the bracket 270 before being secured to the bracket 270 by the retention fingers 274, 275. The fingers 274, 275 inhibit the break-out assembly 200 from being removed from the grasp of the arms 272.

To release the splice assemblies 200, a user pinches, squeezes, or otherwise deflects the latch members 218 of the splice assembly 200 towards each other. The deflection of the latch members 218 moves the ramps 219 out of engagement with the retention fingers 274, 275 (e.g., towards gaps 276), thereby enabling the user to pull the splice assembly 200 out from the bracket 270. In some implementations, the retention fingers 274, 275 each have a width that is less than a width of the corresponding arm 272. Accordingly, sides of the latch members 218 can still engage the arms 272 of the bracket 270 when the ramps 219 are moved out of engagement with the retention fingers 274, 275.

FIGS. 28-32 illustrate another example implementation of a splice assembly 300 for storing splices 175 (e.g., mass fusion splices) between fibers of the optical cable 150 and fibers of the break-out cables 160. The splice assembly 300 includes a first body 310 and a second body 320 that cooperates with the first body 310 to form an enclosure 301 defining an interior. In certain implementations, the bodies 310, 320 are identical to each other. The splices 175 and unjacketed/unbuffered portions of the cables 150, 160 are stored within the interior of the enclosure 301. The enclosure 301 has a first port 302 for the optical cable 150 and a second port 303 for the break-out cables 160. The first port 302 is located at an opposite end of the enclosure 301 from the second port 303.

The bodies 310, 320 are configured to couple together to form the enclosure 301. In some implementations, the bodies 310, 320 are configured to releasably couple together. In other implementations, the bodies 310, 320 are configured to fixedly couple together. In certain implementations, the bodies 310, 320 include alignment features that aid in assembling the enclosure 301. In the example shown, each body 310, 320 includes one or more pins 318 and one or more holes 319. The pins 318 of each body 310, 320 align with the holes 319 of the other body 310, 320. In other implementations, the bodies 310, 320 are coupled together using latches, a friction-fit connection, screws or other fasteners, or other such coupling features.

The enclosure 301 defines a cable input passage 314, a splice retention region 315, and a cable retention region 316. The cable input passage 314 is sized to receive at least a ribbon matrix 155 of the optical cable 150. In certain implementations, the input passage 314 is too narrow to receive the cable jacket 157. In certain implementations, the input passage 314 is too narrow to receive the buffer tube 153. The splice retention region 315 is sized to receive one or more optical splices 175 between the optical cable 150 and the break-out cables 160. In certain implementations, the splice retention region 315 is sized to receive one of the stacked configurations of the splices 175. The cable retention region 316 is sized to receive a cable organizer 330 to which one or more break-out cables 160 can be secured.

In some implementations, the enclosure 301 defines a first tube or body section having a first cross-dimension (e.g., diameter) coupled to a second tube or body section having a second cross-dimension by a tapered/conical body section. The first cross-dimension is larger than the second cross-dimension. In certain implementations, the first tube or body section defines the cable input passage 314 and the second tube or body section defines the splice retention region 315 and cable retention region 316. In certain implementations, each body 310, 320 includes a first section 311, 321 that partially defines the first tube or body section, a second section 312, 322 that partially defines the tapered/conical body section, and a third section 313, 323 that partially defines the second tube or body section.

In some implementations, the first and second bodies 310, 320 define the same or similar internal features. For example, each body may define one or more circumferential ribs 317, 327 that extend radially into the interior of the enclosure 301 (see FIG. 30). In the example shown, the second cable retention region 316 is bounded on opposite ends by circumferential ribs 317, 327. The circumferential ribs 317, 327 hold the cable organizer 330 in position within the enclosure 301 (see FIG. 32). In certain implementations, the circumferential ribs 317, 327 are inwardly recessed from the second port 302.

The cable organizer 330 includes a mounting plate 331 defining slots that extend inwardly from a circumferential edge of the mounting plate 331. The slots are sized to hold one or more crimp arrangements 180 that are coupled to the break-out cables 160. For example, each crimp arrangement 180 secures to a jacket and/or strength layer of the break-out cable 160. In the example shown, the crimp arrangement 180 includes a forward portion 181 from which the optical fibers of the break-out cable 160 extend, a rearward portion 182 that secures to the jacket and/or strength layer, and a narrow portion 183 that fits within one of the slots in the mounting plate 331.

The cable organizer 330 also includes routing extensions 334 that extend away from the mounting plate 331 along the longitudinal axis of the enclosure 301. The routing extensions 334 defines passages 335 along which fibers of the break-out cables 160 can extend between the mounting plate 331 and the splices 175. Ribs 336 can be provided in the passages 335 as positions axially spaced from the mounting plate 331. The ribs 336 are shaped and sized to receive the crimp arrangements 180 of the break-out cables 160. Accordingly, the ribs 336 provide alternative mounting locations for the break-out cables 160 if rework is performed or the fibers of the break-out cables 160 are otherwise too short to be secured to the mounting plate 331. The routing extensions further aid in retaining the crimp arrangements 180 within the passages 335.

In some implementations, the mounting plate 331 defines slots of different lengths. For example, in FIG. 29, the mounting plate 331 defines long slots 332 that extend a first distance radially into the mounting plate 331 and short slots 333 that extend a second distance radially into the mounting plate 331. The second distance is shorter than the first distance. In some implementations, the long slots 332 are sized to hold two crimp arrangements 180 along the length of the slot 332 and the short slots 333 are sized to hold one crimp arrangement 180 (see FIG. 30). In certain implementations, the mounting plate 331 defines an alternating arrangement of slots 332, 333 (see FIG. 29).

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A splice enclosure comprising:
   a body extending along a longitudinal axis between opposite first and second ends of the body, the body having a length, a width, and a height that are transverse to each other, the length extending along the longitudinal axis and being larger than the height and larger than the width, the body defining a passage extending along the length;
   a first port disposed at the first end of the body and leading to the passage, the first port defining a first opening extending across a majority of the first end;
   a second port disposed at the second end of the body and leading to the passage, the second port defining a second opening; and
   a splice retention region disposed within the body along the longitudinal axis between the first port and the second port, the body having a first internal cross-dimension at the splice retention region, the first internal cross-dimension being sized to be substantially filled by a plurality of mass fusion splices;
   the body including a necked in section disposed between the splice retention region and the first port, the body having a second internal cross-dimension at the necked in section, the second internal cross-dimension being smaller than the first internal cross-dimension.

2. The splice enclosure of claim 1, wherein the body includes a first part and a second part.

3. The splice enclosure of claim 2, wherein the second part latches to the first part.

4. The splice enclosure of claim 1, further comprising a cover that closes lateral access to the passage.

5. The splice enclosure of claim 1, wherein the second opening is one of a plurality of second openings at the second end of the body.

6. The splice enclosure of claim 5, wherein each of the second openings is sized to receive multiple groups of optical fibers.

7. The splice enclosure of claim 5, wherein the second openings are aligned along the width of the body.

8. The splice enclosure of claim 1, wherein the passage defines a cable routing path extending straight from the first port, through the splice retention region, to the second port.

9. The splice enclosure of claim 1, wherein the splice retention region is devoid of structure to individually support mass fusion splices.

10. The splice enclosure of claim 1, further comprising:
    a plurality of first optical fibers extending into the passage at the first port;
    a plurality of second optical fibers extending into the passage at the second port; and
    a plurality of mass fusion splices coupling the first optical fibers to the second optical fibers, the mass fusion splices being disposed at the splice retention region.

11. The splice enclosure of claim 10, wherein the first optical fibers are routed to the mass fusion splices along linear paths.

12. The splice enclosure of claim 11, wherein the second optical fibers are routed to the mass fusion splices along linear paths.

13. The splice enclosure of claim 10, further comprising epoxy disposed within the body.

14. The splice enclosure of claim 13, wherein the epoxy surrounds the first optical fibers to retain the first optical fibers within the body.

15. The splice enclosure of claim 14, wherein the body is configured to inhibit flow of the epoxy towards the splice retention region.

16. The splice enclosure of claim 15, wherein the body includes a barrier wall that extends laterally towards the longitudinal axis to define a pocket for the epoxy.

17. The splice enclosure of claim 10, wherein the mass fusion splices are disposed in a stack.

18. The splice enclosure of claim 17, wherein the stack is one of a plurality of stacks of the mass fusion splices.

19. The splice enclosure of claim 18, wherein the stacks are disposed at a common axial location within the splice retention region.

20. A splice enclosure comprising:
    a body extending along a longitudinal axis between opposite first and second ends of the body, the body having a length, a width, and a height that are transverse to each other, the length extending along the longitudinal axis and being larger than the height and larger than the width, the body defining a passage extending along the length;
    a first port disposed at the first end of the body and leading to the passage, the first port defining a first opening extending across a majority of the first end;
    a second port disposed at the second end of the body and leading to the passage, the second port defining a second opening; and
    a splice retention region disposed within the body along the longitudinal axis between the first port and the second port, the body having a first internal cross-dimension at the splice retention region, the first internal cross-dimension being sized to be substantially filled by a plurality of mass fusion splices;
    a plurality of first optical fibers extending into the passage at the first port;
    a plurality of second optical fibers extending into the passage at the second port; and
    a plurality of mass fusion splices coupling the first optical fibers to the second optical fibers, the mass fusion splices being disposed at the splice retention region, wherein the first optical fibers are routed to the mass fusion splices along linear paths.

21. The splice enclosure of claim 20, wherein the second optical fibers are routed to the mass fusion splices along linear paths.

22. The splice enclosure of claim 20, further comprising epoxy disposed within the body.

23. The splice enclosure of claim 22, wherein the epoxy surrounds the first optical fibers to retain the first optical fibers within the body.

24. The splice enclosure of claim 23, wherein the body is configured to inhibit flow of the epoxy towards the splice retention region.

25. The splice enclosure of claim 24, wherein the body includes a barrier wall that extends laterally towards the longitudinal axis to define a pocket for the epoxy.

26. The splice enclosure of claim 20, wherein the mass fusion splices are disposed in a stack.

27. The splice enclosure of claim 26, wherein the stack is one of a plurality of stacks of the mass fusion splices.

28. The splice enclosure of claim 27, wherein the stacks are disposed at a common axial location within the splice retention region.

* * * * *